United States Patent
Dufresne

(10) Patent No.: US 10,781,968 B2
(45) Date of Patent: Sep. 22, 2020

(54) ANCHORS AND METHODS FOR ANCHORING AN UNDERGROUND STORAGE TANK

(71) Applicant: PULTRUSION TECHNIQUE INC., St-Bruno, Québec (CA)

(72) Inventor: Robert Dufresne, Saint-Bruno (CA)

(73) Assignee: PULTRUSION TECHNIQUE INC., St-Bruno, Québec (CA)

(*) Notice: Subject to any disclaimer, the term of this patent is extended or adjusted under 35 U.S.C. 154(b) by 0 days.

(21) Appl. No.: 16/678,763

(22) Filed: Nov. 8, 2019

(65) Prior Publication Data

US 2020/0103072 A1 Apr. 2, 2020

Related U.S. Application Data

(62) Division of application No. 15/129,306, filed as application No. PCT/CA2015/050237 on Mar. 27, 2015, now Pat. No. 10,533,701.

(Continued)

(51) Int. Cl.
  *F16M 13/02* (2006.01)
  *B65D 88/76* (2006.01)
(52) U.S. Cl.
  CPC .............. *F16M 13/02* (2013.01); *B65D 88/76* (2013.01); *F16M 2200/08* (2013.01)
(58) Field of Classification Search
  CPC ..... F16M 13/02; F16M 2200/08; B65D 88/76

(Continued)

(56) References Cited

U.S. PATENT DOCUMENTS

| 2,124,441 A | * | 7/1938 | Thwaits | B60P 3/22 |
| | | | | 220/686 |
| 4,828,076 A | * | 5/1989 | Fox | B60T 3/00 |
| | | | | 188/32 |

(Continued)

FOREIGN PATENT DOCUMENTS

CA 2854824 A1 5/2013

OTHER PUBLICATIONS

International Search Report and Written Opinion for Application No. PCT/CA2015/050237, dated Jun. 15, 2015.

(Continued)

*Primary Examiner* — Nkeisha Smith
(74) *Attorney, Agent, or Firm* — Marshall, Gerstein & Borun LLP

(57) ABSTRACT

Various anchors and methods for anchoring an underground storage tank are provided. The anchor includes a base and at least one retention mechanism connected to the base for retaining various configurations of hooks and straps for holding the tank. The retention mechanism includes an opening and a retention member that is configured to open or close the opening by displacing or collapsing said retention member. The anchor may include a composite base having a footing and a spine extending upwardly from the footing so as to define footing portions on either side of the spine. The footing and the spine may have a composite composition that includes a matrix material and a reinforcement structure embedded within the matrix material. The retention mechanism may be connected to the spine of the composite base for retaining a hook for anchoring the underground storage tank.

15 Claims, 28 Drawing Sheets

Related U.S. Application Data

(60) Provisional application No. 62/030,845, filed on Jul. 30, 2014, provisional application No. 61/970,991, filed on Mar. 27, 2014.

(58) Field of Classification Search
USPC .......................................................... 248/499
See application file for complete search history.

(56) References Cited

U.S. PATENT DOCUMENTS

| | | | | |
|---|---|---|---|---|
| 5,487,518 | A * | 1/1996 | McCraney | F24H 9/06 248/225.11 |
| 5,645,701 | A * | 7/1997 | Dufresne | C25C 7/00 204/288.1 |
| 5,848,776 | A * | 12/1998 | Craig | B65D 88/76 248/505 |
| 6,345,933 | B1 * | 2/2002 | Harding | B65D 88/76 405/157 |
| 6,467,344 | B1 | 10/2002 | Ly et al. | |
| 6,786,689 | B2 * | 9/2004 | Dorris | B61D 45/003 410/47 |
| 6,974,288 | B2 * | 12/2005 | Tatina | B60P 7/0807 410/106 |
| 7,337,590 | B2 | 3/2008 | Burwell et al. | |
| 7,513,725 | B1 * | 4/2009 | Bullock | B60P 3/075 410/10 |
| 8,348,563 | B2 * | 1/2013 | Buxton | B60P 7/12 410/50 |
| 8,807,512 | B2 | 8/2014 | Watson et al. | |
| 8,967,930 | B2 * | 3/2015 | Jespersen | B65D 90/00 410/44 |
| 9,061,380 | B2 * | 6/2015 | Schneider | B23P 17/04 |
| 9,151,073 | B2 | 10/2015 | Watson et al. | |
| 9,228,606 | B2 * | 1/2016 | Dufresne | F16B 45/02 |
| 9,469,235 | B2 * | 10/2016 | Anderson | B60P 3/077 |
| 2008/0101864 | A1 * | 5/2008 | Dorris | E02D 27/38 405/53 |

OTHER PUBLICATIONS

European Search Report for Application No. 15767741.0 dated Feb. 23, 2018, 10 pages.

* cited by examiner

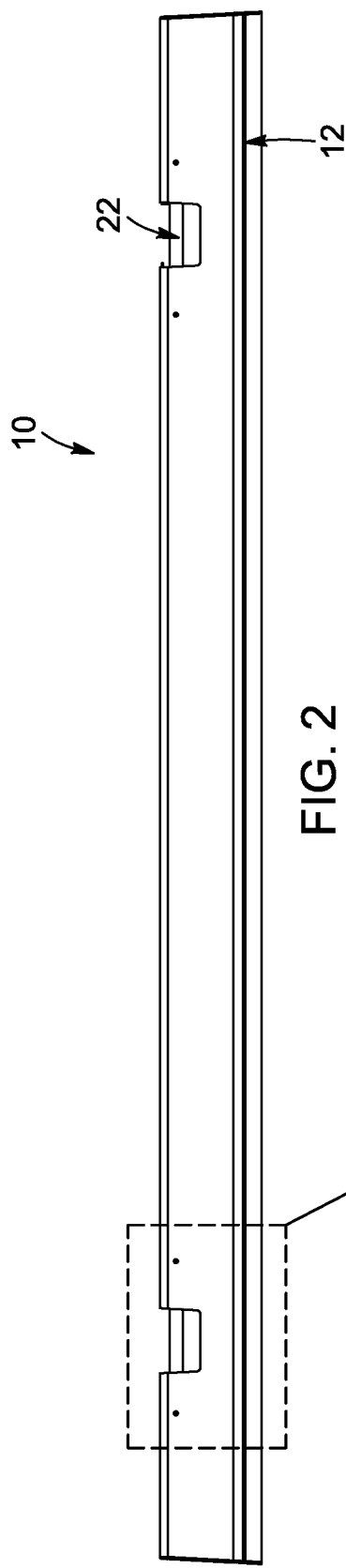
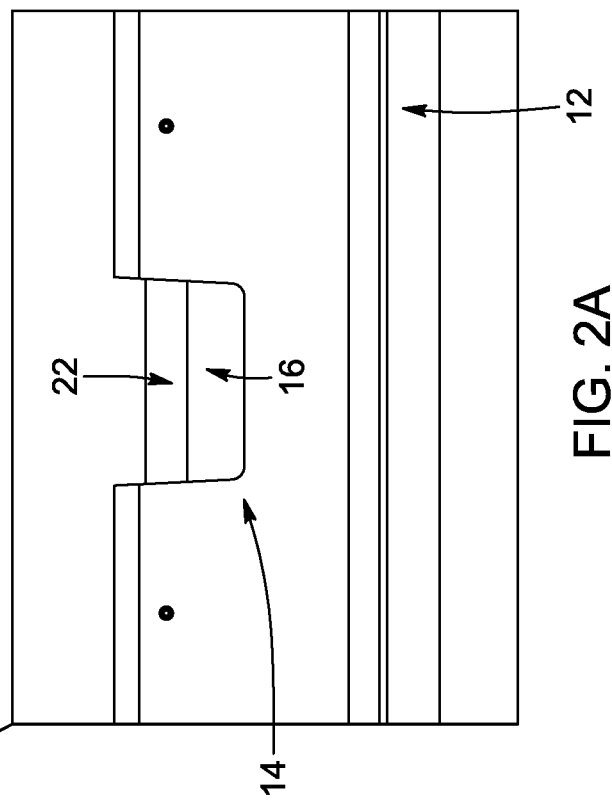

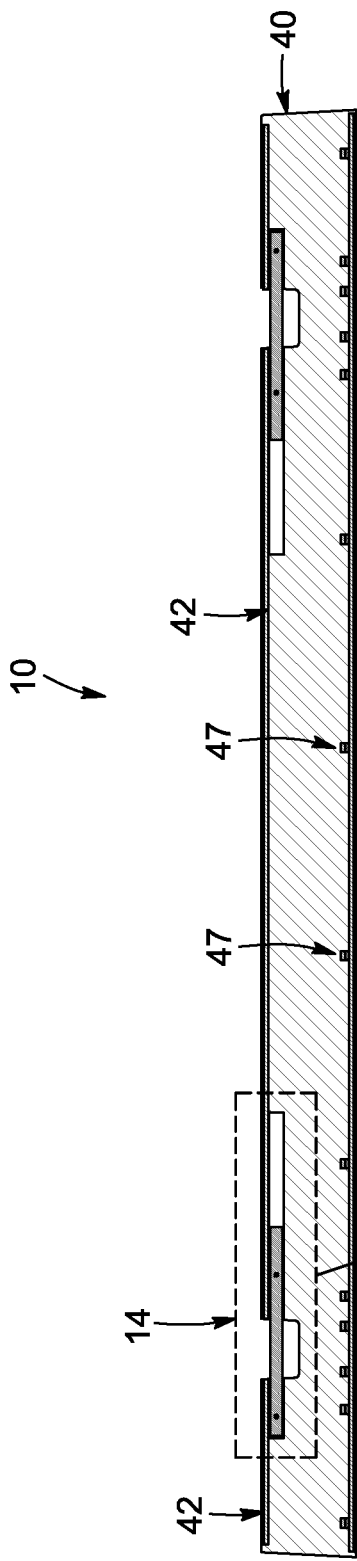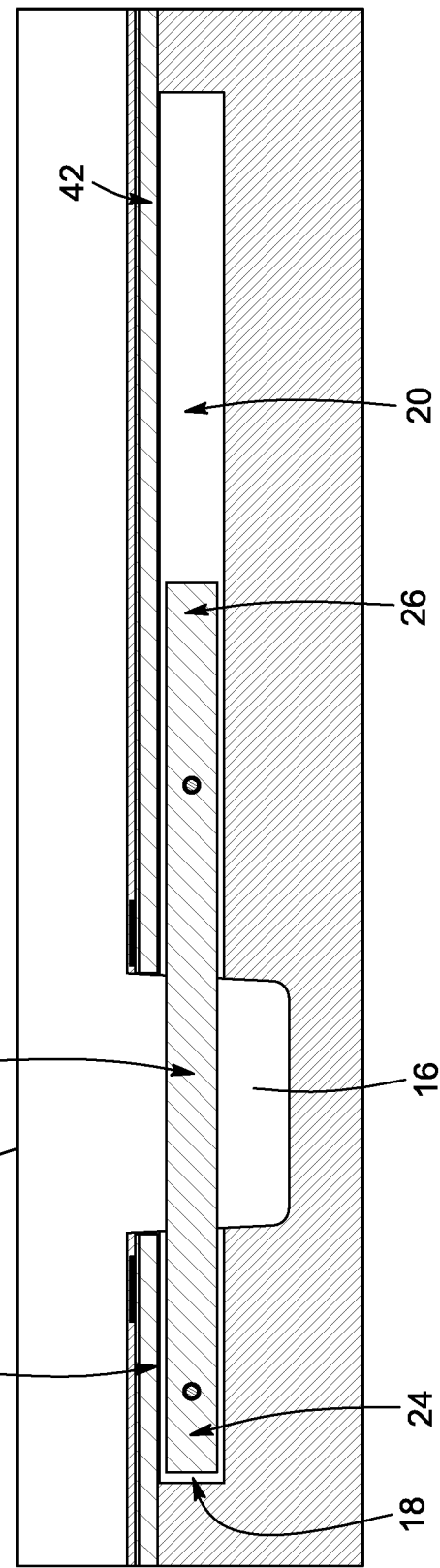

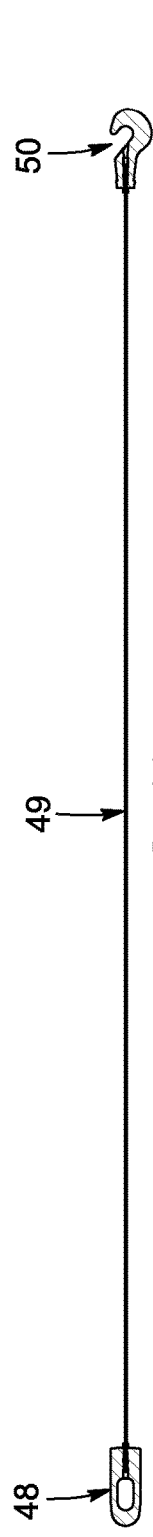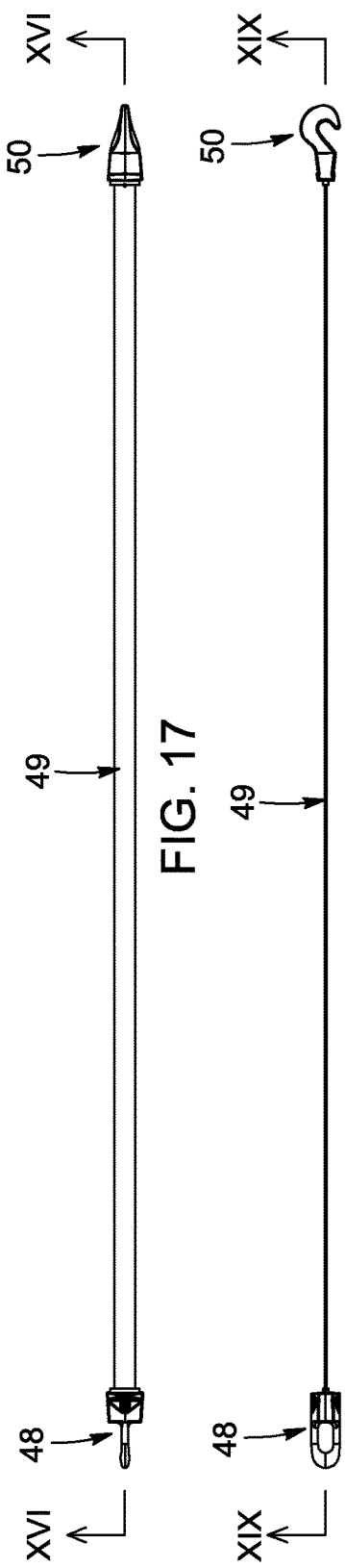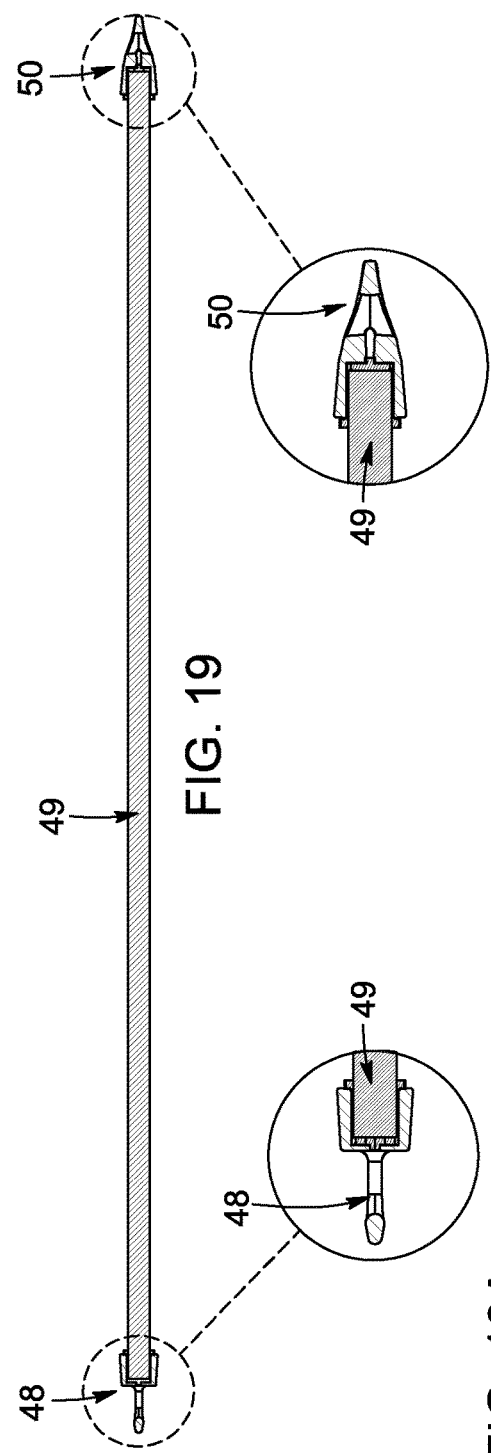

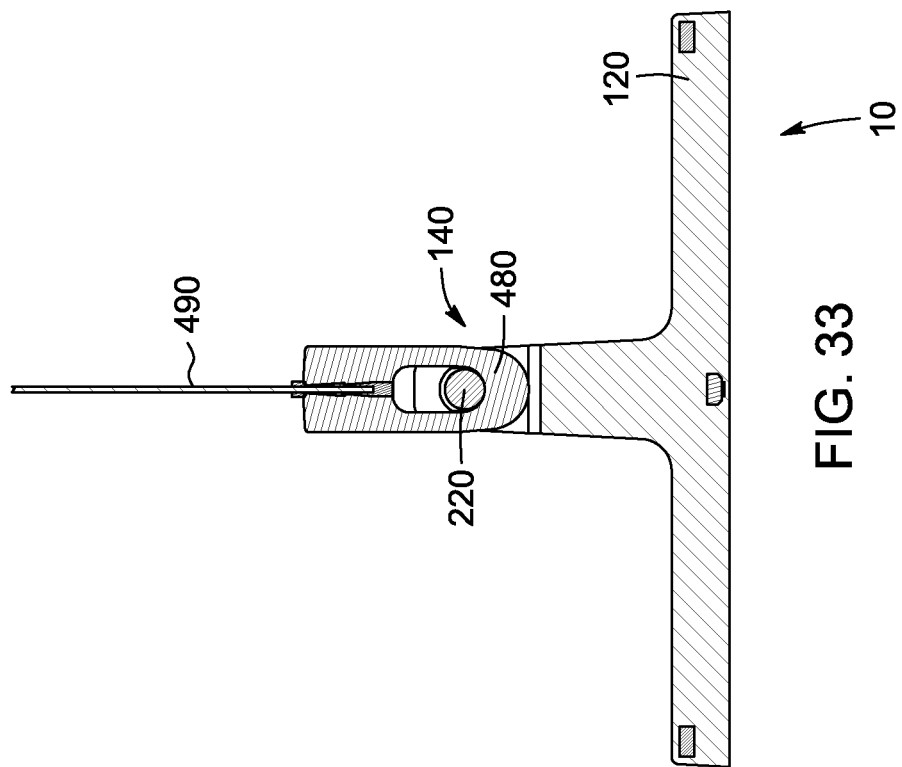
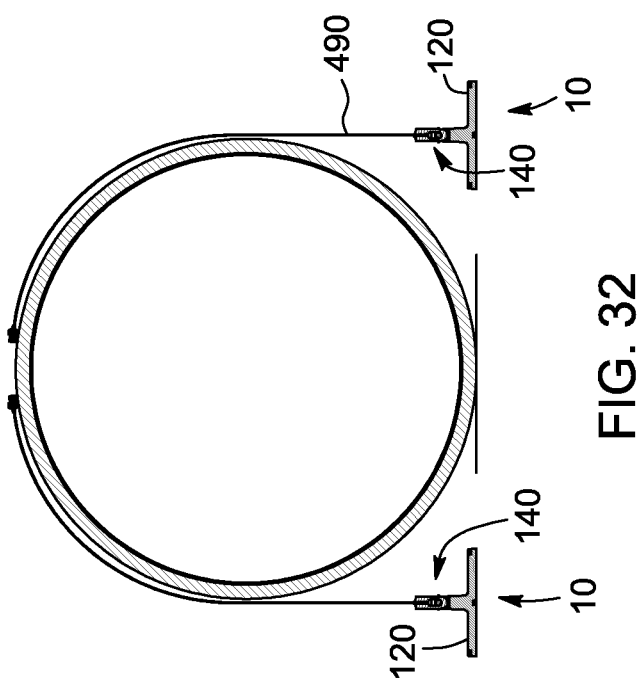

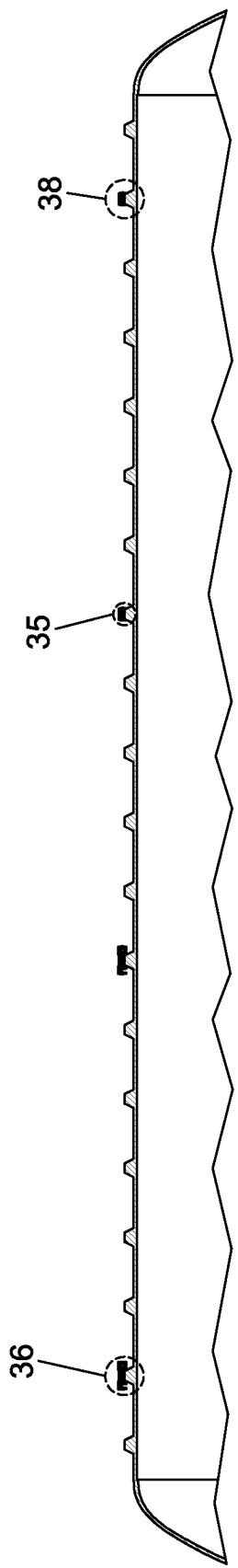
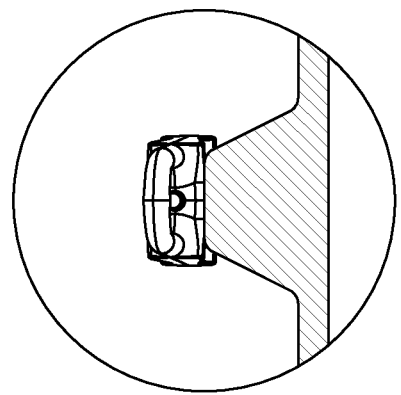
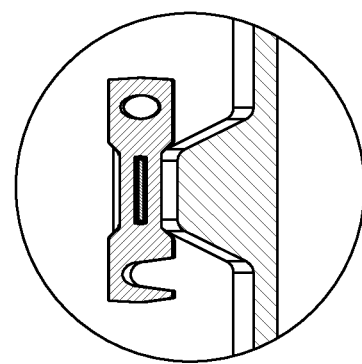
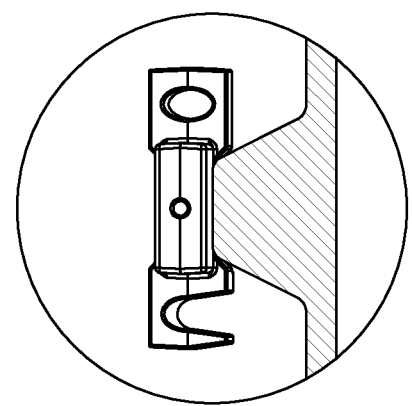
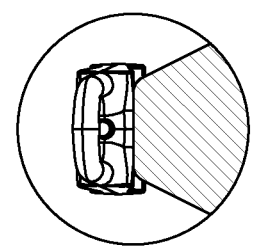
FIG. 34
FIG. 35
FIG. 36
FIG. 37
FIG. 38

ANCHORS AND METHODS FOR ANCHORING AN UNDERGROUND STORAGE TANK

CROSS-REFERENCE TO RELATED APPLICATION

The present application is a divisional of US national phase application Ser. No. 15/129,306, filed Sep. 26, 2016, which was the US national phase of International Patent Application No. PCT/CA2015/050237, filed Mar. 27, 2015, which application claimed the benefit of the filing dates of U.S. Provisional Application Nos. 61/970,991, filed Mar. 27, 2014, and 62/030,845, filed Jul. 30, 2014. The priority applications, Ser. No. 15/129,306, and U.S. Provisional Application Nos. 61/970,991 and 62/030,845, are hereby incorporated by reference.

FIELD

The present field generally relates to underground tanks and, more particularly, to anchors and methods for anchoring an underground tank.

BACKGROUND

Underground storage tanks, commonly referred to as USTs, are often used in storing fluids such as petroleum fluids, fuels, solvents, water or other fluid products.

Installation of USTs presents a number of challenges. Typically, anchoring structures commonly called "deadmen" are placed within an excavation pit beside the UST, straps are arranged to overly the UST along its length, and the straps are connected to the deadmen by various types of connectors that may include turnbuckles and hooks. For example, lowering a deadman into the pit and connecting the deadman to the hooks can be difficult and inefficient.

There is thus a need for techniques that respond to challenges related to construction and installation of UST anchors.

SUMMARY

In some implementations, there is provided an anchor for anchoring an underground storage tank. The anchor includes a base and a retention mechanism connected to the base. The retention mechanism includes an opening in the base; a first chamber and a second chamber extending from the opening in generally opposed relation to each other; a retention member including a first end and a second end respectively insertable into the first chamber and the second chamber, the retention member being sized and configured to be displaceable between an open position where the first end of the retention member is located within the opening and is insertable through a hook; and a closed position where the first end is located within the first chamber and the second end is located in the second chamber, thereby retaining the hook with respect to the retention member.

In some implementations, the retention member is a retention bar.

In some implementations, the retention bar has a one-piece structure.

In some implementations, the retention bar is straight.

In some implementations, the retention bar and the first and second chambers are oriented lengthwise along the base and in generally parallel relation with respect to a longitudinal axis of the underground tank.

In some implementations, the anchor further includes a locking mechanism for locking the retention mechanism with respect to the base in the closed position.

In some implementations, the locking mechanism includes a pin-and-hole locking system.

In some implementations, the locking mechanism includes a hole provided through the base and communicating with one of the chambers; a recess provided in the retention mechanism, the recess being located so as to align with the hole in the closed position; and a pin insertable through the hole and into the recess so as to secure the retention mechanism with respect to the base in the closed position.

In some implementations, the hole and the pin are oriented in transverse relation with respect to the retention member.

In some implementations, the locking mechanism includes a first locking system for locking the first end of the retention member within the first chamber and/or a second locking system for locking the second end of the retention member within the second chamber.

In some implementations, the first chamber and the second chamber each have a closed end.

In some implementations, the retention member, the first chamber and the second chamber are sized and configured such that the first end of the retention member abuts on the closed end of the first chamber in the closed position.

In some implementations, the retention member, the first chamber and the second chamber are sized and configured such that the second end of the retention member abuts on the closed end of the second chamber in the open position.

In some implementations, the retention member has a cylindrical bar shape, and the first chamber and the second chamber each have a cylindrical shape.

In some implementations, the anchor further includes multiple retention members arranged along the base.

In some implementations, the anchor may include multiple openings provided along the base wherein two adjacent openings have a common chamber which extends from one opening to the adjacent opening and through the base, such that the retention member can slide along the common chamber to close at least one of the two adjacent openings.

In some implementations, the chambers of the multiple openings may communicate with one another so as to form a collinear tunnel.

In some implementations, the first chamber extending from the opening located at an edge of the anchor may have an open end which can slidably receive one or more retention members inserted through the open end.

In some implementations, the anchor further includes a connector extending from the base to connect the base to the base of an adjacent anchor.

In some implementations, the base includes concrete or polymer concrete.

In some implementations, the base includes a composite material.

In some implementations, the base includes at least two retention mechanisms.

In some implementations, the composite material is a polymer-concrete or a pultruded material.

In some implementations, the retention mechanism is embedded within the base.

In some implementations, the retention member, the first chamber and the second chamber are sized to prevent the retention member from moving upwards.

In some implementations, the second chamber has a greater depth than the first chamber or wherein the first chamber has a greater depth than the second chamber.

In some implementations, the retention member is made of a non-corroding material.

In some implementations, the retention member is made of steel.

In some implementations, the retention member is made of a composite material.

In some implementations, the composite material is a pultruded material.

In some implementations, there is provided an anchor for anchoring an underground storage tank. The anchor includes a composite base including: a footing; and a spine extending upwardly from the footing so as to define footing portions on either side of the spine; in which the footing and the spine have a composite composition including: a matrix material; and a reinforcement structure embedded within the matrix material; and a retention mechanism connected to the spine of the composite base for retaining a hook for anchoring the underground storage tank.

In some implementations, the anchor further includes an envelope enclosing the composite base.

In some implementations, the footing portions are about equally sized.

In some implementations, the footing portions each have an upward-facing surface for contacting overlying backfill, each upward-facing surface having area width of at least about between 4 to 14 inches for a diameter of the tank being about between 6 to 8 feet. Optionally, each upward-facing surface may have area width of at least about between 10 to 14 inches for a diameter of the tank being about between 6 to 8 feet.

In some implementations, the footing portions each have an upward-facing surface for contacting overlying backfill, each upward-facing surface having area width of at least about between 8 to 16 inches for a diameter of the tank being about 10 feet. Optionally, each upward-facing surface may have area width of at least about between 8 to 20 inches for a diameter of the tank being about 10 feet.

In some implementations, the footing portions each have an upward-facing surface for contacting overlying backfill, each upward-facing surface having area width of at least about between 10 to 20 inches for a diameter of the tank being about 12 feet. Optionally, each upward-facing surface may have area width of at least about between 10 to 26 inches for a diameter of the tank being about 12 feet.

In some implementations, the footing portions each have substantially the same length as the spine.

In some implementations, the footing portions are generally the same size.

In some implementations, the reinforcement structure further includes reinforcing bars.

In some implementations, the reinforcing bars include an upper reinforcement bars extending within the spine; a lower reinforcement bars extending within the footing below the spine; and reinforcement connectors each fixed to a corresponding upper reinforcement bar and a corresponding lower reinforcement bar.

In some implementations, the retention mechanism further includes an opening in the spine; a first chamber and a second chamber extending from the opening in generally opposed relation to each other in the spine; a retention member including a first end and a second end respectively insertable into the first chamber and the second chamber, the retention member being sized and configured to be displaceable between: an open position where the first end of the retention member is located within the opening and is insertable through the hook; and a closed position where the first end is located within the first chamber and the second end is located in the second chamber, thereby retaining the hook with respect to the retention member.

In some implementations, corresponding upper reinforcement bars are located such that a portion thereof overlies the first and second chambers respectively, to provide structural reinforcement in response to upward force exerted on the retention member.

In some implementations, the retention member is a retention bar.

In some implementations, the retention bar has a one-piece structure.

In some implementations, the retention bar is straight.

In some implementations, the retention bar and the first and second chambers are oriented lengthwise along the base and in generally parallel relation with respect to a longitudinal axis of the underground tank.

In some implementations, the reinforcing bars further include additional bars provide in each of the footing portions.

In some implementations, the reinforcement structure includes wire mesh.

In some implementations, there is provided a method for anchoring an underground storage tank. The method includes providing an excavation pit sized to bury the underground storage tank, a first anchor and a second anchor as defined above; placing the under underground storage tank, the first anchor and the second anchor in the excavation pit; providing an anchoring strap connected to a first hook, a tightening mechanism and a second hook; connecting the first hook to the retention mechanism of the first anchor; placing the anchoring strap over the underground storage tank; connecting the second hook to the retention mechanism of the second anchor; engaging the tightening mechanism to provide a tension sufficient to hold the tank; and filling the excavation pit with backfill material to bury the underground storage tank, the first anchor and the second anchor for anchoring the underground storage tank.

In some implementations, the method includes providing at least two anchors.

In some implementations, the method includes providing at least four anchors.

In some implementations, there is provided a method for transporting the underground storage tank. The method includes providing the underground storage tank, a first anchor and a second anchor as described above on a flatbed trailer; providing an anchoring strap connected to a first hook, a tightening mechanism and a second hook; connecting the first hook to the retention mechanism of the first anchor; placing the anchoring strap over the underground storage tank; connecting the second hook to the retention mechanism of the second anchor; engaging the tightening mechanism to a pre-determined tension; and transporting the underground storage tank to a location.

BRIEF DESCRIPTION OF THE DRAWINGS

FIG. 2 schematically illustrates a side view of an anchor for anchoring an underground storage tank.

FIG. 2A is a close-up view of a portion of FIG. 2.

FIG. 8 schematically illustrate a cross-section view of the anchor of FIG. 2.

FIG. 8A is a close-up view of a portion of FIG. 8.

FIG. 16 schematically illustrates a side view of a D-shaped hook and a C-shaped hook on an anchoring strap for anchoring an underground storage tank.

FIG. 17 schematically illustrates a top view of a D-shaped hook and a C-shaped hook on an anchoring strap for anchoring an underground storage tank.

FIG. 18 schematically illustrates another side view of a D-shaped hook and a C-shaped hook on an anchoring strap for anchoring an underground storage tank.

FIG. 19 schematically illustrates a cross-sectional view of a D-shaped hook and a C-shaped hook on an anchoring strap for anchoring an underground storage tank.

FIG. 19A is a close-up view of the C-shaped hook of FIG. 19.

FIG. 19B is a close-up view of the D-shaped hook of FIG. 19.

FIG. 32 schematically illustrates a cross-section view of anchors anchoring an underground tank.

FIG. 33 schematically illustrates a close-up view of a portion of FIG. 32.

FIG. 34 schematically illustrates a top part of a side view of an underground storage tank.

FIG. 35 schematically illustrates a close-up view of an attachment mechanism of FIG. 34.

FIG. 36 schematically illustrates a close-up view of another attachment mechanism of FIG. 34.

FIG. 37 illustrates a cross-section view of the attachment mechanism of FIG. 36.

FIG. 38 schematically illustrates a close-up view of another attachment mechanism of FIG. 34.

DETAILED DESCRIPTION

In some implementations, there is provided an anchor having an enhanced retention mechanism for connection to a hook while anchoring an underground tank and/or having a novel base construction that may include an inverted "T" cross-sectional shape and a composite makeup including a matrix material and reinforcing member. In some implementations, the enhanced retention mechanism may include a protrusion extending from the base. Some implementations of the anchor can enable the anchor to be relatively lightweight and can facilitate installation of the hook-and-strap system for anchoring the tank.

It should be noted that the anchors and methods described herein can be used for various UST applications. The excavation pit into which the anchor(s) and UST are placed may have a variety of configurations and dimensions, the backfill used to fill in the pit may be various different aggregates and soils, the hook-and-strap system for securing the UTS to the anchors may be of various different types and constructions, and the UTS itself may be made of various materials such as steel, stainless steel, metals, fiberglass, concrete or polymer concrete or combinations thereof.

Anchor with Retention Mechanism

According to some implementations, there is provided an anchor for anchoring an underground storage tank and the anchor includes a base and a retention mechanism connected to the base. The retention mechanism may include an opening in the base; a first chamber and a second chamber extending from the opening in generally opposed relation to each other; and a retention member. The retention member includes a first end and a second end respectively insertable into the first chamber and the second chamber. The retention member is sized and configured to be displaceable between an open position where the first end of the retention member is located within the opening and is insertable through a hook; and a closed position where the first end is located within the first chamber and the second end is located in the second chamber, thereby retaining the hook with respect to the retention member.

Figure 1:
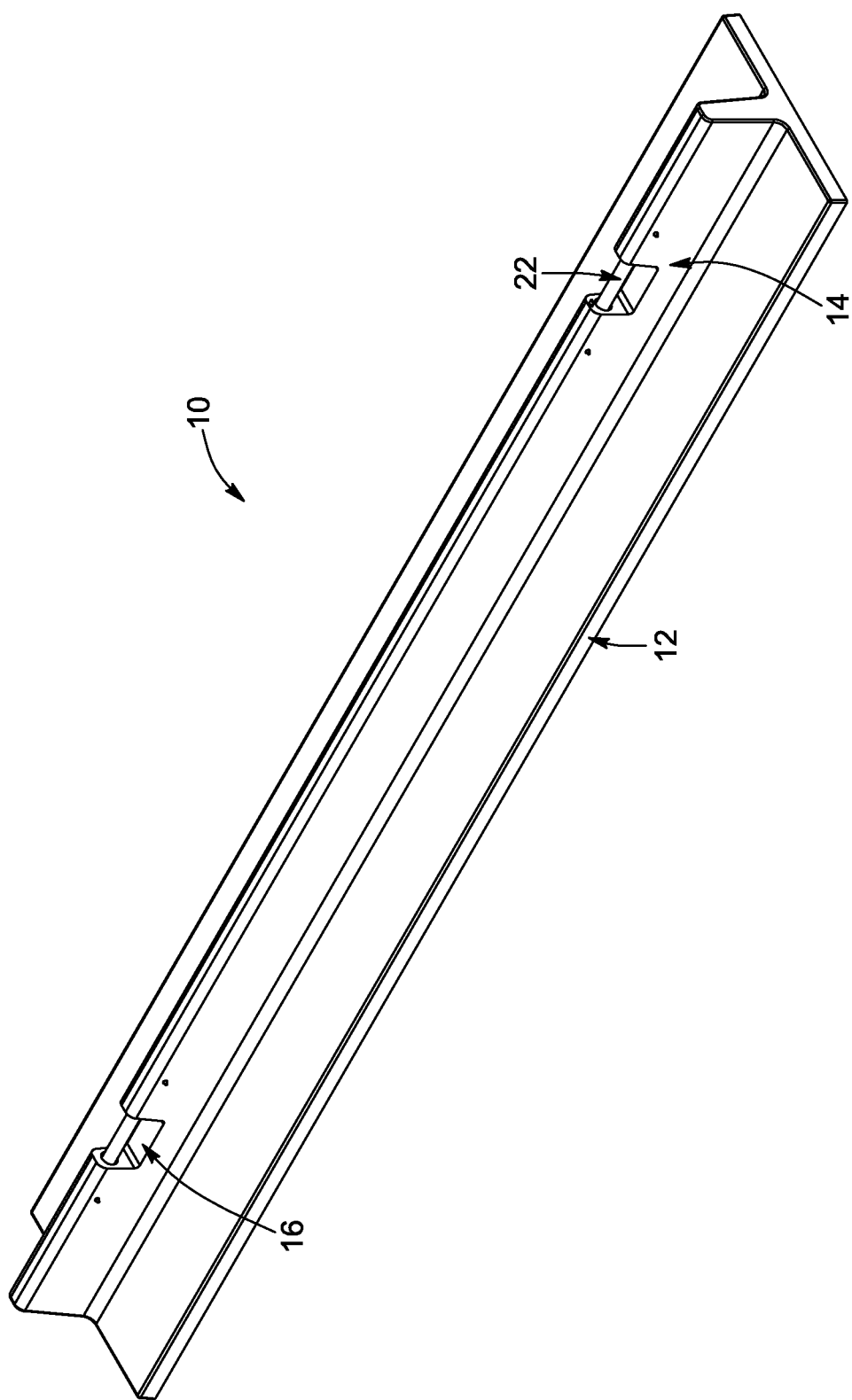
FIG. 1 schematically illustrates a perspective view of an anchor for anchoring an underground storage tank.

Referring to FIGS. 1 and 2, an embodiment of the anchor 10 for anchoring an underground storage tank is illustrated. In this embodiment, the anchor 10 includes a base 12 and a retention mechanism 14 connected to the base 12. The retention mechanism 14 may include an opening 16 that extends into the base 12.

Figure 9:
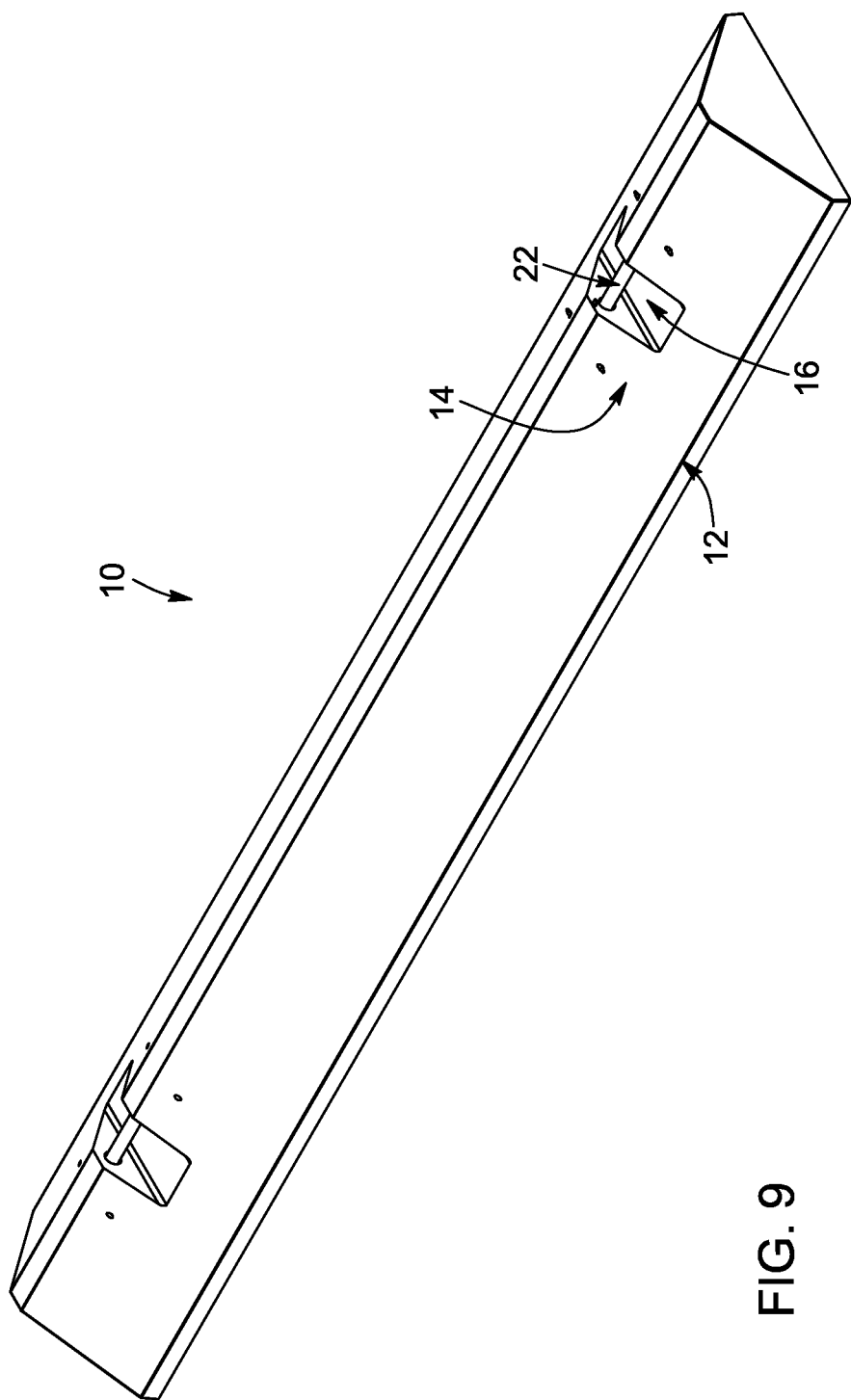
FIG. 9 schematically illustrates a perspective view of an anchor for anchoring an underground storage tank.

In some embodiments, the anchor 10 may include a triangular shape as illustrated in FIG. 9.

Figure 3:
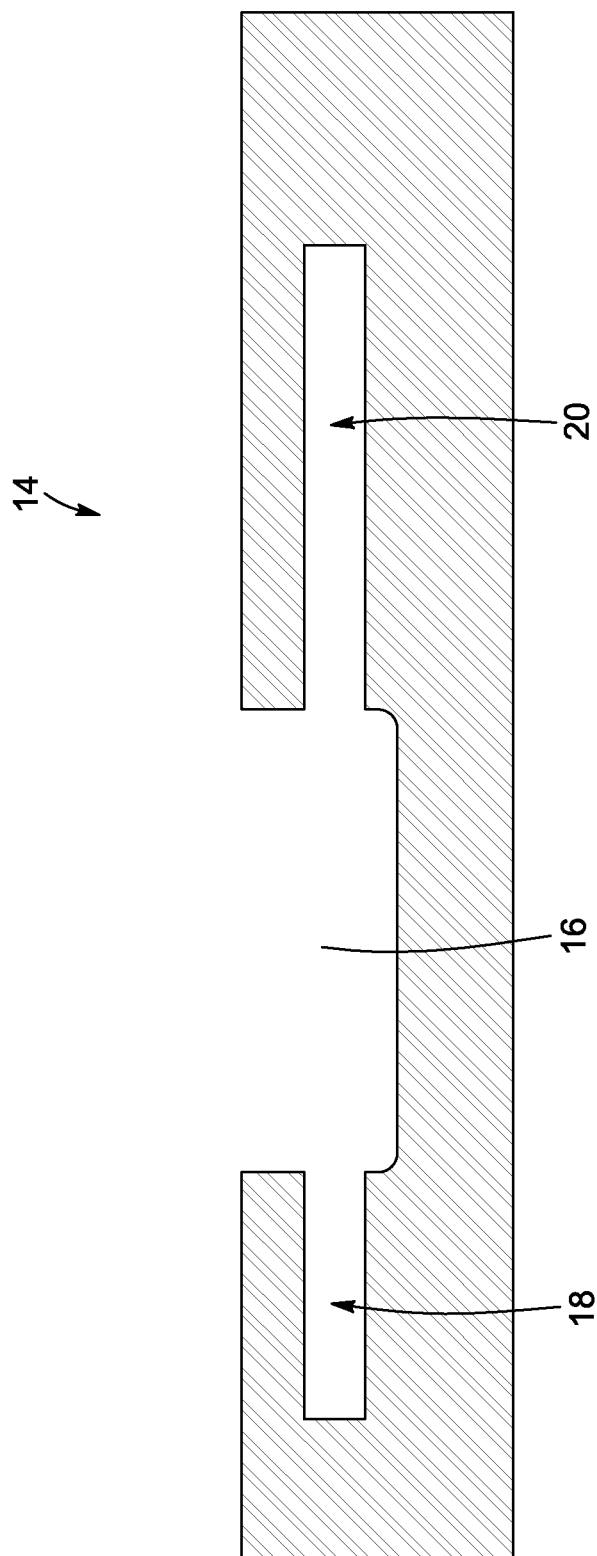
FIG. 3 schematically illustrates a side view of part of an anchor for anchoring an underground storage tank.
Figure 4:
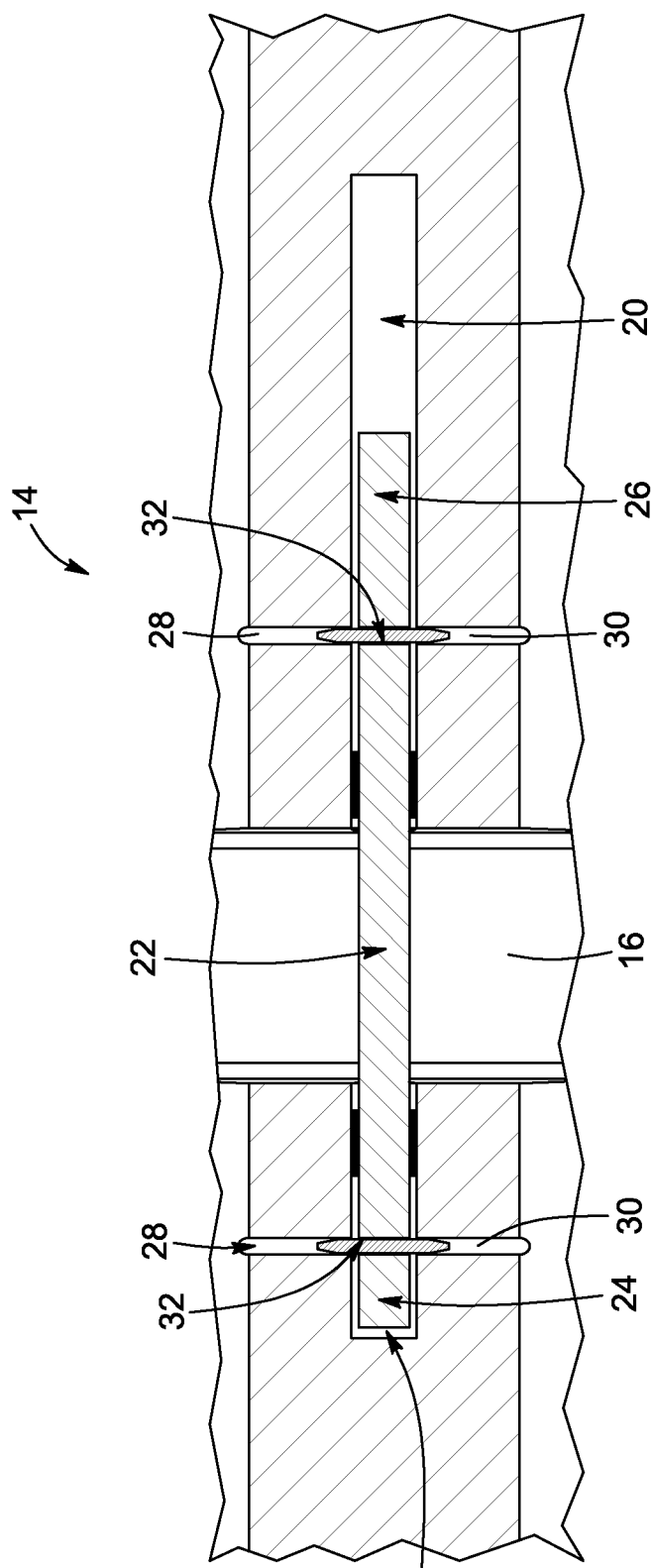
FIG. 4 schematically illustrates a close-up cross-sectional view of a portion of an anchor for anchoring an underground storage tank.

Referring now to FIGS. 3 and 4, in some scenarios the retention mechanism 14 includes a first chamber 18 and a second chamber 20 extending from the opening 16, in generally opposed relation to each other. The retention mechanism 14 also includes a retention member 22. The retention member 22 includes a first end 24 and a second end 26 respectively insertable into the first chamber 18 and the second chamber 20. The retention member 22 is sized and configured to be displaceable between an open position where the first end 24 of the retention member 22 is located within the opening 16 and is insertable through a hook (not illustrated here); and a closed position where the first end 24 is located within the first chamber 18 and the second end 26 is located in the second chamber 20, thereby retaining the hook with respect to the retention member 22. FIG. 4 schematically illustrates the retention mechanism 14 in the closed position without the hook.

Referring to FIG. 4, the retention member 22 may be a retention bar. The retention bar may have a one-piece structure. The retention bar may be straight, and the first and second chambers may therefore be arranged directly opposite each other. In addition, the retention bar and the first and second chambers 18, 20 may be oriented lengthwise along the base 12 and in generally parallel relation with respect to a longitudinal axis of the underground tank. Typically, one or more anchor is placed on each side of the underground tank within the excavation pit at a distance from the bottom of the tank. The anchor may have a generally elongate shape such that the anchor flanks the underground tank which may also have a generally elongate shape (e.g., cylindrical arranged on its side). In this arrangement where the retention mechanism may be arranged such that retention bar extends lengthwise, installation of certain types of hook-and-strap systems may be facilitated, for instance where the hook-and-strap system has a pivoted D-shaped hook oriented so that its opening faces the end of the retention bar. Alternatively, in some scenarios the retention mechanism may be arranged transverse relation with respect to the length of the UST and the anchor, and the hook-and-strap system may be adapted accordingly.

The retention bar may be made of material and have a construction to resist deflection in response to upward forces. The retention bar may, for example, be composed of stainless steel, fiberglass, galvanized cast iron or any other suitable material.

In some implementations, the length of the anchor can be approximately equal to the length of the tank. Alternatively, there may be multiple anchors arranged end-to-end along one side of a given tank and attached together, such that the total length of the multi-anchor system is approximately equal to the length of the tank. In the multi-anchor scenario, the anchors on each side may be connected to each other via various types of connection mechanisms.

In some implementations, the retention member 22 may have a cylindrical bar shape, and the first chamber 18 and the second chamber 20 may each have a cylindrical shape.

In some implementations, the retention member 22 may have an octagonal bar shape, and the first chamber 18 and the second chamber 20 may each have an octagonal shape. In some other implementations, the retention member 22 may have a cylindrical bar shape, and the first chamber 18 and the second chamber 20 may each have a circular shape in cross-section.

In some implementations, the retention member 22 may have a cylindrical bar shape, and the first chamber 18 and the second chamber 20 may each have a cylindrical shape. Optionally, the retention member and the chambers may have a hexagonal or octagonal shape for example.

Referring now to FIG. 8, in some implementations the retention member 22, the first chamber 18 and the second chamber 20 are preferably sized to prevent the retention member 22 from moving upwards. Also, the second chamber 20 may have a greater depth than the first chamber 18. The first chamber 18 may also have a greater depth than the second chamber 20.

In some implementations, the retention member 22 may be made of a non-corroding material. Optionally, the retention member may be made of steel. Also optionally, the retention member may be made of a composite material that may be a pultruded material.

Anchor with Locking Mechanism

Referring back to FIG. 4, the anchor 10 may include a locking mechanism for locking the retention mechanism 14 with respect to the base 12 in the closed position. The locking mechanism may be used with the retention mechanism illustrated and described herein, or with another type of retention mechanism. The locking mechanism may include a pin-and-hole locking system. Thus, the locking mechanism may include a hole 28 provided through the base 12 and communicating with one of the chambers 18, 20, and a recess 30 provided in the retention mechanism 14, the recess 30 being located so as to align with the hole 28 in the closed position. It should be noted that the recess 30 in the retention member may take the form of a groove or a channel that extends all the way through the retention member as shown in FIG. 4. In some implementations, the locking mechanism may include a nut-and-bolt locking system.

Figure 5:
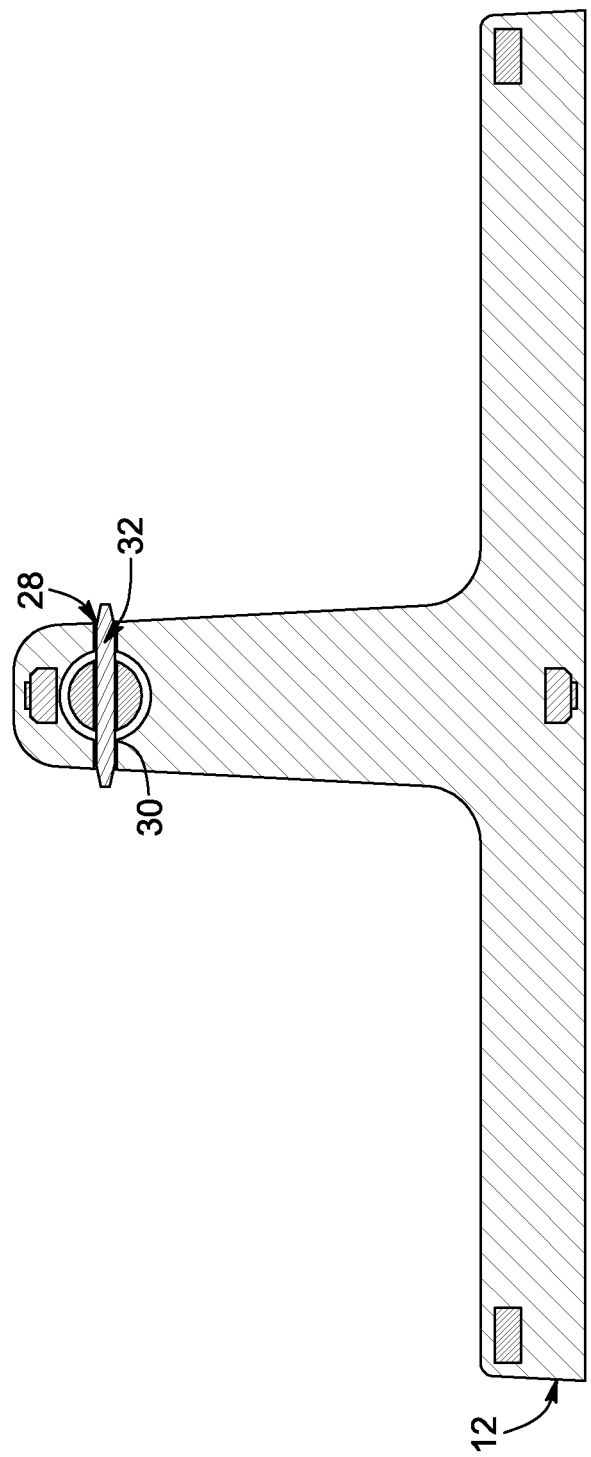
FIG. 5 schematically illustrates a side view of a locking mechanism of an anchor for anchoring an underground storage tank.

Referring now to FIG. 5, the locking mechanism may also include a pin 32 insertable through the hole 28 and into the recess 30 so as to secure the retention member with respect to the base 12 in the closed position. In some implementations, the pin 32 may be glued or press fit within the hole 28. The hole 28 and the pin 32 may be oriented in transverse relation with respect to the retention member. Optionally, the locking mechanism includes a first locking system for locking the first end of the retention member within the first chamber. Optionally, the locking mechanism may include a second locking system for locking the second end of the retention member within the second chamber.

Referring to FIG. 4, the first chamber 18 and the second chamber 20 may each have a closed end. Optionally, the retention member 22, the first chamber 18 and the second chamber 20 are sized and configured such that the first end 24 of the retention member 22 abuts on the closed end of the first chamber 18 in the closed position. Also optionally, the retention member 22, the first chamber 18 and the second chamber 20 are sized and configured such that the second end 26 of the retention member 22 abuts on the closed end of the second chamber 20 in the open position. The sizing and configuration of the chambers and the retention member may be so as to facilitate alignment of the holes and recesses or other locking mechanism components.

Anchor Base Systems and Constructions

One or more anchors may be used on each side of a given UST, depending on the size and configuration of the UST as well as the configuration and construction of the anchors.

Figure 6:
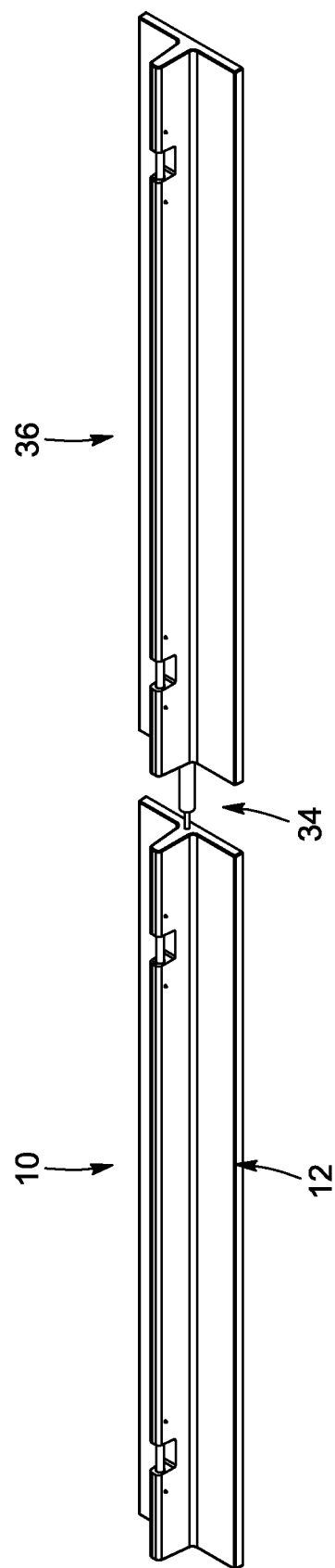
FIG. 6 schematically illustrates a perspective view of two adjacent anchors connected to each other for anchoring an underground storage tank.

Referring to FIG. 6, the anchor 10 may also further include a connector 34 extending from the base 12 to connect the base 12 to the base of an adjacent anchor 36. The connector 34 may be a rod having opposed ends that are respectively embedded into adjacent bases 12 in order to hold the anchors together. The connectors 34 may be prefabricated and fixed within the two bases, or may be insertable with securing mechanisms during installation of the anchors within the excavation pit.

Referring to FIG. 1, in some implementations the anchor 10 may include multiple retention mechanisms arranged along the length of the base. For example, the anchor 10 may have at least two retention mechanisms that are equally spaced apart from corresponding ends of the base. For example, as shown in FIG. 1, the anchor 10 includes two retention mechanisms near opposed ends. Retention mechanisms may also be provided generally in the middle of the base. The number of retention mechanisms may depend on various factors such as the size and configuration of the UST as well as the configuration and construction of the anchors.

Referring to FIGS. 1 and 2, one of more retention mechanisms 14 may be provided along the base. The retention mechanism can be embedded into the upper part of the base, as illustrated, such that part of the base defines the walls of the opening and the chambers. Alternatively, retention mechanisms 14 may be attached to the base in various other ways and may sit on top of the upper surface of the base.

The base of the anchor may be constructed in various ways. In some implementations, the base has a composite construction including a matrix material and a reinforcement structure embedded within the matrix material.

In some implementations, the base may include a footing, a spine extending upwardly from the footing so as to define footing portions on either side of the spine, in which the footing and the spine have a composite composition. The composite composition includes a matrix material and a reinforcement structure embedded within the matrix material. The base may have an inverted "T" cross-sectional shape. The retention mechanism is connected to the spine of the composite base for retaining a hook for anchoring the underground storage tank. The retention mechanism used in association with the composite base may be the mechanism described in detail herein or may be a different kind of retention mechanism for attachment to hooks.

Figure 7:
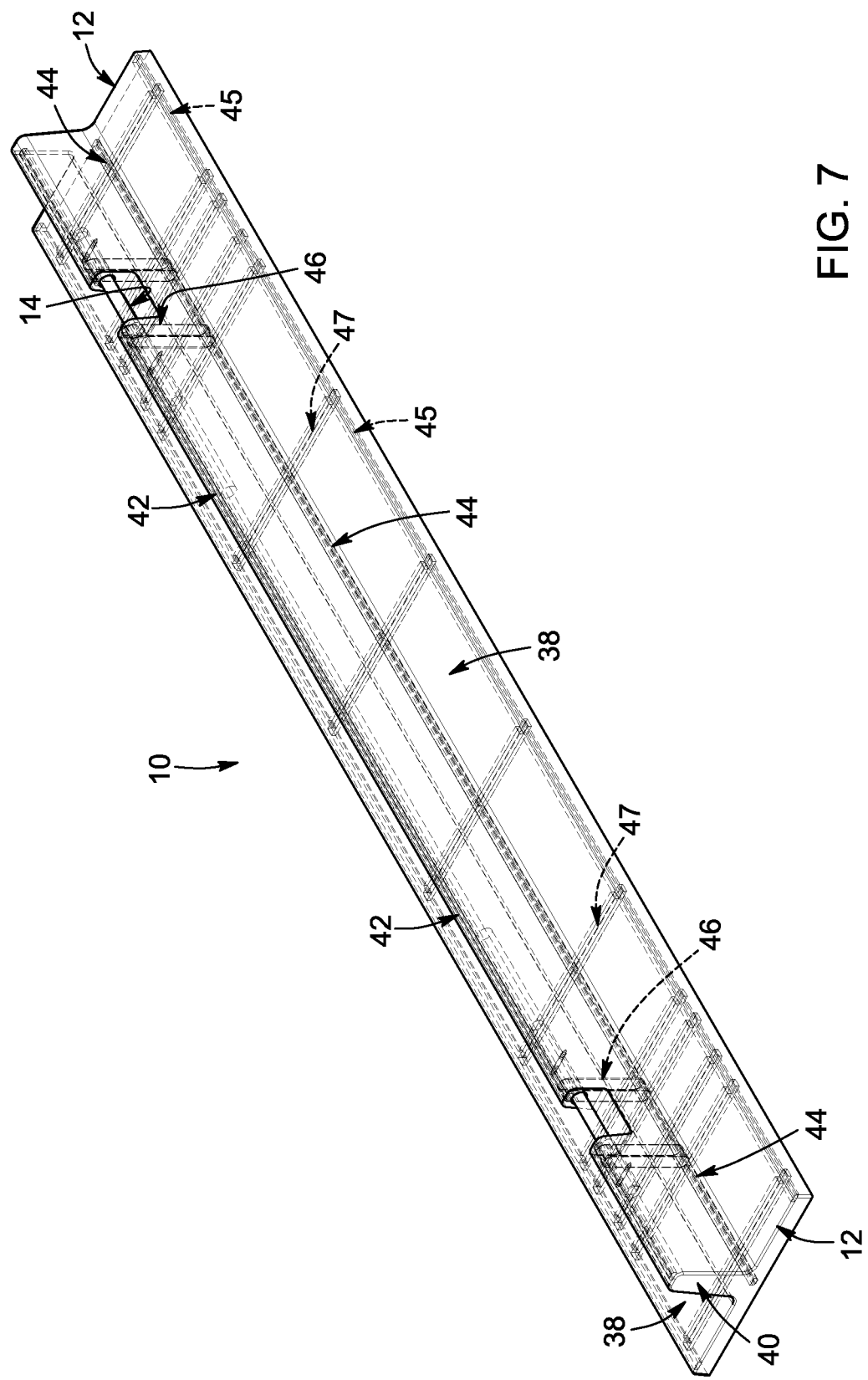
FIG. 7 schematically illustrates a perspective view of an anchor for anchoring an underground storage tank.

Referring to FIG. 7, in some implementations the composite base 12 includes a footing 38 and a spine 40 extending upwardly from the footing 38 so as to define footing portions on either side of the spine 40. The footing 38 and the spine 40 have a composite composition that includes a matrix material and a reinforcement structure embedded within the matrix material. The anchor 10 further includes a retention mechanism 14 connected to the spine 40 of the composite base 12 for retaining a hook for anchoring the underground storage tank.

Optionally, the footing portions are about equally sized. Also optionally, the footing portions each have an upward-facing surface for contacting overlying backfill, each upward-facing surface having a width of at least about between 4 to 14 inches for a tank having a diameter of about between 6 to 8 feet; at least about between 8 to 16 inches for a tank having a diameter of about 10 feet; or at least about between 10 to 20 inches for a tank having a diameter of about 12 feet. The width of the upward-facing surface may be provided such that the weight of the backfill provides sufficient or predetermined downward force on the anchors in order to hold down the UST. The footing portions may each have substantially the same length as the spine. The footing portions may also generally be the same size as each other.

Still referring to FIG. 7, the reinforcement structure may include reinforcing bars that extend throughout the matrix material in both the footing and spine parts of the base. The reinforcing bars may include upper reinforcement bars 42 extending within the spine, lower reinforcement bars 44 extending within the footing 38 below the spine 40, and reinforcement connectors 46 each being fixed to a corresponding upper reinforcement bar and a corresponding lower reinforcement bar.

Referring to FIGS. 7 and 8, the opening 16 for the retention member 14 may be in the spine 40; and the first chamber 18 and the second chamber 20 extending from the opening 16 in generally opposed relation to each other are also provided in the spine 40.

Referring to FIG. 8, in some implementations, corresponding upper reinforcement bars 42 may be located such that a portion of the upper reinforcement bars overlies the first 18 and second 20 chambers respectively, to provide structural reinforcement in response to upward force exerted on the retention member 22. Thus, when the retention member 22 is engaged by the hook, the upward forces are transmitted to the upper reinforcement bars 42 which are held down by the reinforcement connectors 46 to the lower reinforcement bars 44 that extend into the footings, thus distributing the upward forces through the base.

Referring to FIG. 7, the lower reinforcement bars 44 may include longitudinal bars 45 that extend along the length of the base and lateral bars 47 that extend across the footing of the base. There may be more lateral bars 47 proximate to the location of the retention mechanism 14 compared to the other areas of the base, as illustrated in FIGS. 7 and 8, to provide additional reinforcement in areas of the base subjected to greater forces.

In some implementations, the reinforcement structure may include wire mesh alone or in addition to reinforcement bars.

In some implementations, the anchor 10 may have a weight of between about 30 kg and about 200 kg.

In some implementations, the matrix material of the base may include concrete or a composite material such as a polymer-concrete, a pultruded material or steel bars.

Withstanding Buoyancy Forces

In some implementations, the anchor components are configured to withstand buoyancy forces of an anchored tank. The size and configuration of various components, such as the retention members and the footings, may be considered.

In some instances, within the excavation pit where the tank is anchored, there may be a water-table high enough to create a buoyancy force within the tank. The expression "water-table" is intended to refer to a water level present in the excavation pit where the tank is anchored. The water level may be the result of infiltrating precipitation through pores in the ground where the tank is anchored. As a result, the anchored tank may have a tendency to "float" upwards and thus this buoyancy force may create an upward force on the retention mechanism.

Base Envelope Construction

Referring to FIG. 4, in some scenarios the anchor 10 further includes an envelope enclosing the composite base 12. The base envelope is generally made of a woven roving or knitted roving glass fiber and conforms to the composite base 12. The general function of the base envelope is to strengthen the overall composite base 12.

In some implementations, the base envelope sufficiently strengthens the composite base and the reinforcement bars or structure may not be required.

Installation Techniques

For installation, two hooks are generally attached to opposed ends of an anchoring strap, optionally via corresponding turnbuckles. The hook may be a C-shaped hook, a D-shaped hook, a spring-hook or any other adequate type of hook. Preferably, the hook is a pivoted D-shaped hook through which the retention bar can be threaded. Advantageously, provided that the anchoring strap has at least one pivoted D-shaped hook, as shown in FIGS. 11 to 14 and 16 to 19, the tank installation circumvents the need for using at least one turnbuckle or tensional mechanism. Turnbuckles may be avoided all together, provided that the anchoring strap has a pivoted D-shaped hook attached to each opposed ends of the anchoring strap.

In some implementations, the anchoring strap includes a pivoted D-shaped hook and a C-shaped hook.

In some implementations, the anchoring strap includes a pivoted D-shaped hook and a D-shaped hook. In some implementations, the anchoring strap includes a pivoted D-shaped hook and a T-shaped hook.

Figure 10:
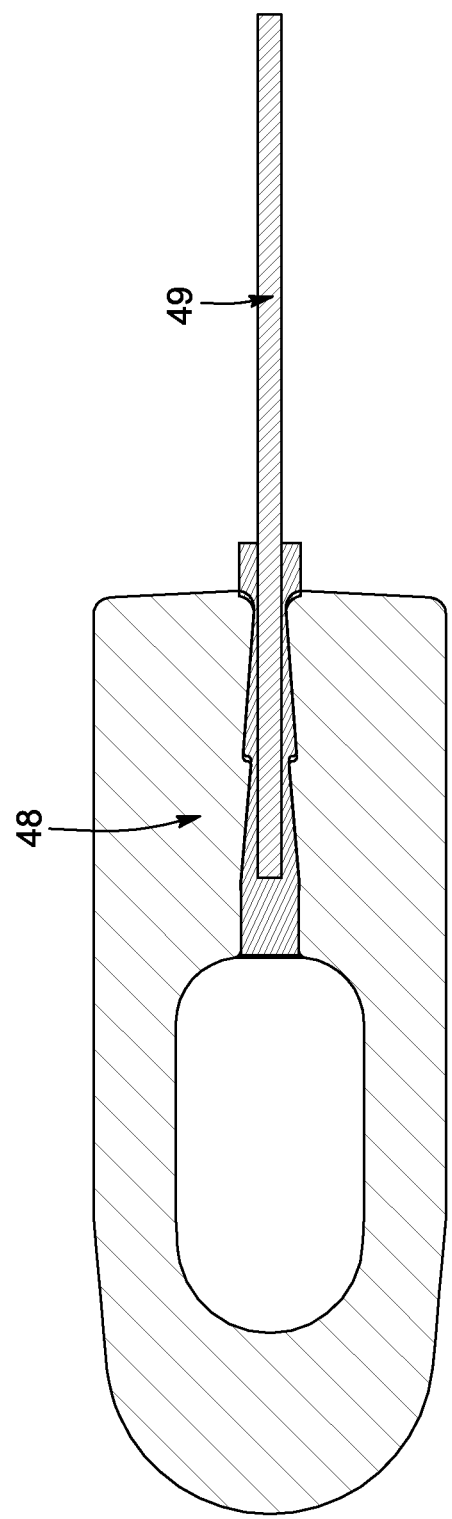
FIG. 10 schematically illustrates a front view of a D-shaped hook for anchoring an underground storage tank.
Figure 11:
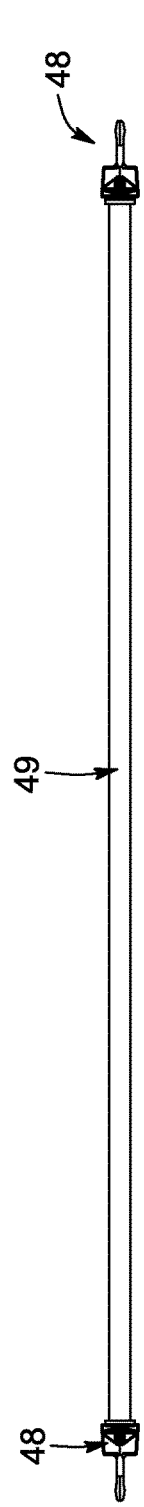
FIG. 11 schematically illustrates a side view of a D-shaped hook on an anchoring strap for anchoring an underground storage tank.
Figure 12:
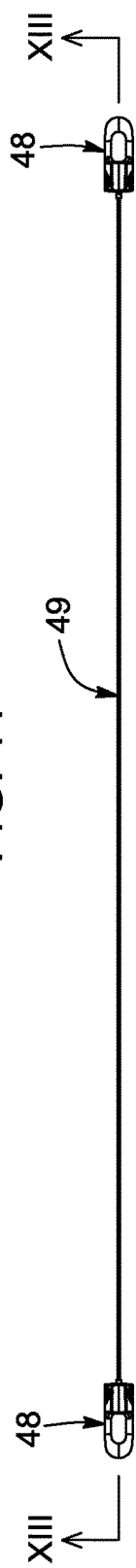
FIG. 12 schematically illustrates a top view of a D-shaped hook on an anchoring strap for anchoring an underground storage tank.
Figure 13:
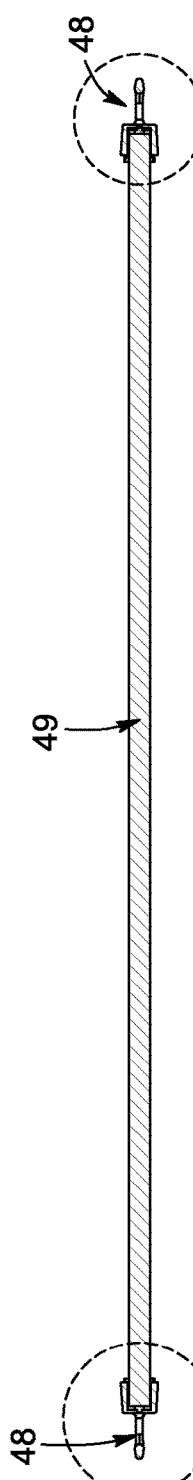
FIG. 13 schematically illustrates another side view of a D-shaped hook on an anchoring strap for anchoring an underground storage tank.
Figure 13B:
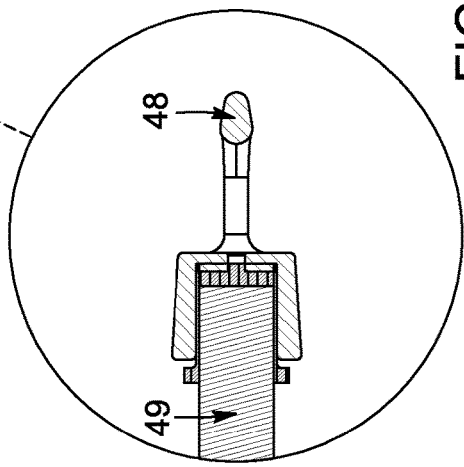
FIG. 13B is an enlarged view of the other D-shaped hook of FIG. 13 on an opposite end of the anchoring strap.
Figure 13A:
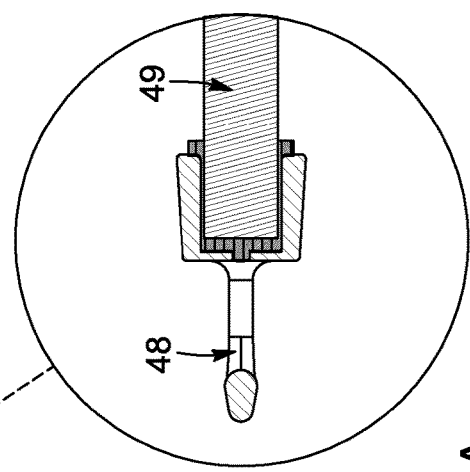
FIG. 13A is an enlarged view of a D-shaped hook of FIG. 13 on the anchoring strap.
Figure 14:
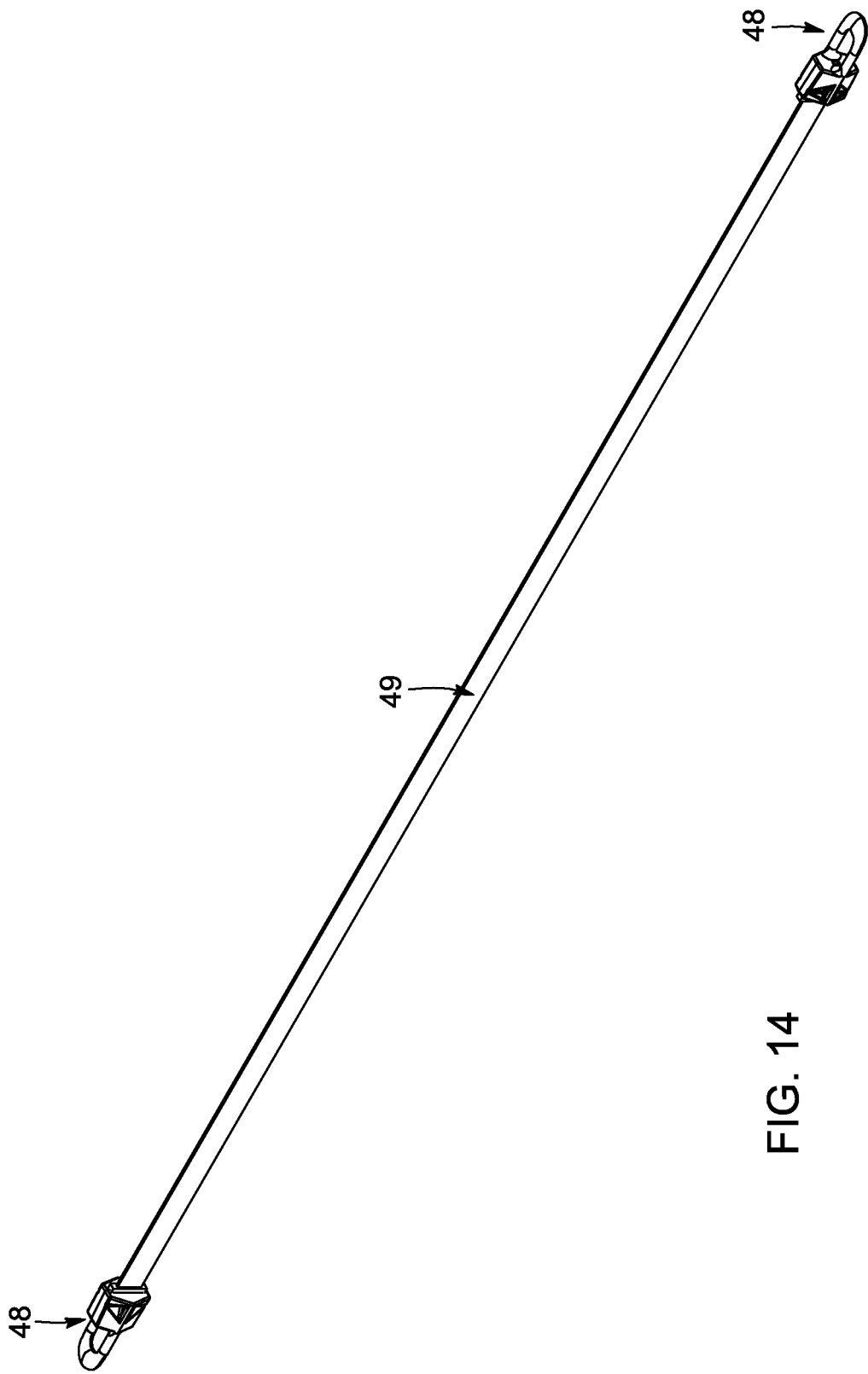
FIG. 14 schematically illustrates a perspective view of a D-shaped hook on an anchoring strap for anchoring an underground storage tank.
Figure 15:
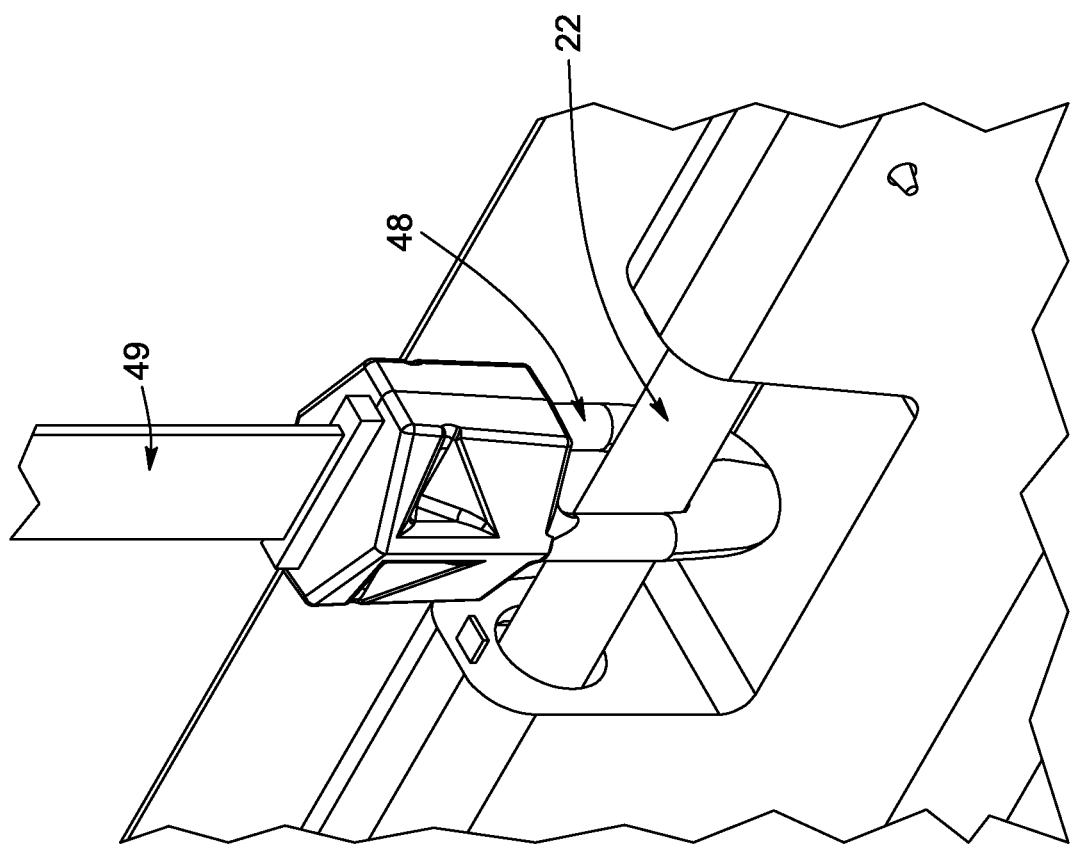
FIG. 15 schematically illustrates a D-shaped hook hooked to a retention mechanism of an anchor for anchoring an underground storage tank.
Figure 20:
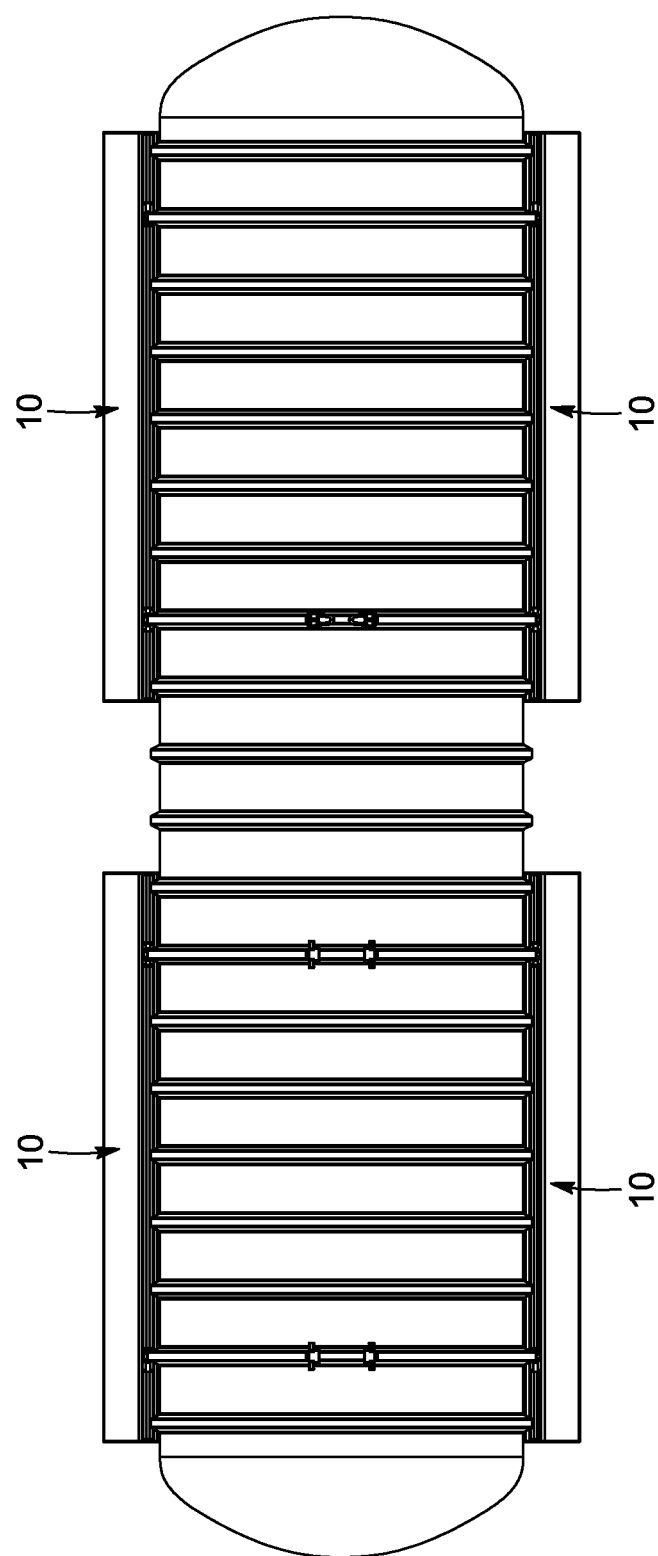
FIG. 20 schematically illustrates a top view of an anchor anchoring an underground storage tank.
Figure 21:
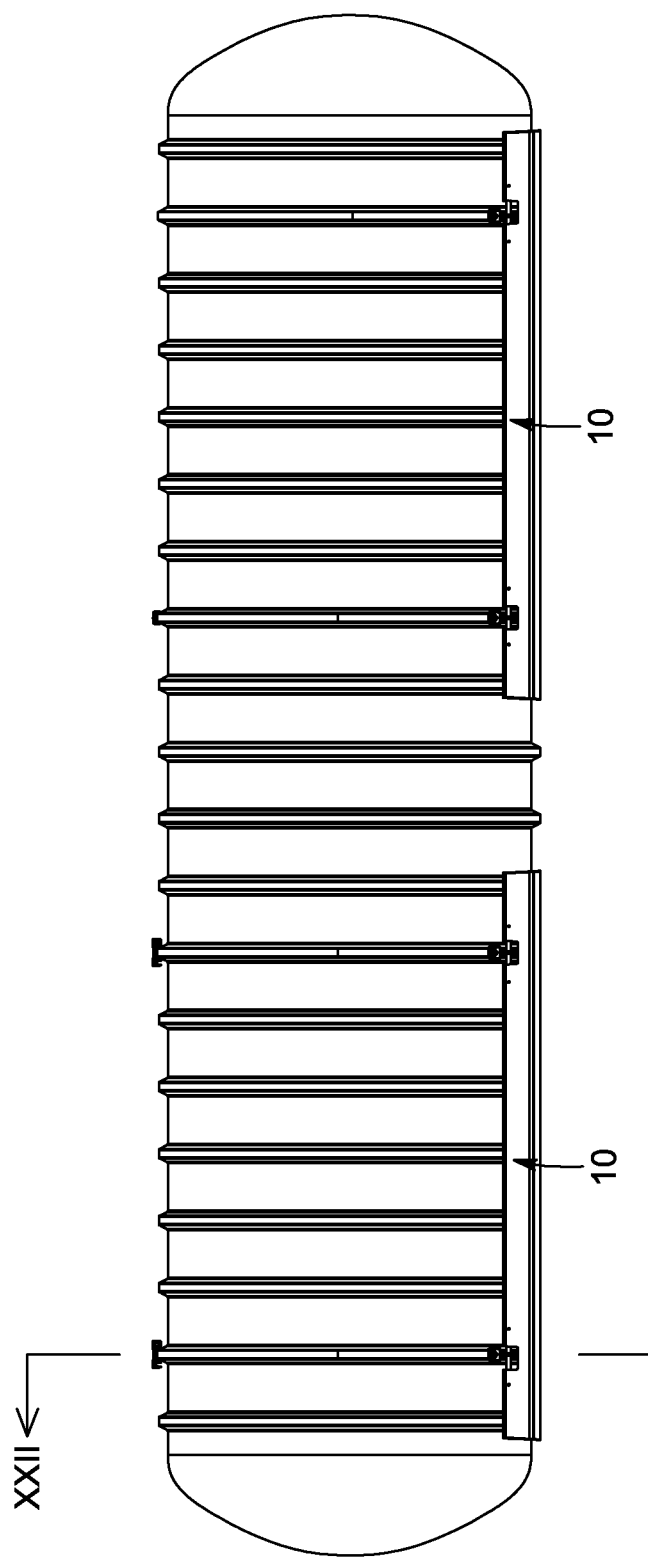
FIG. 21 schematically illustrates a side view of an anchor anchoring an underground storage tank.
Figure 22:
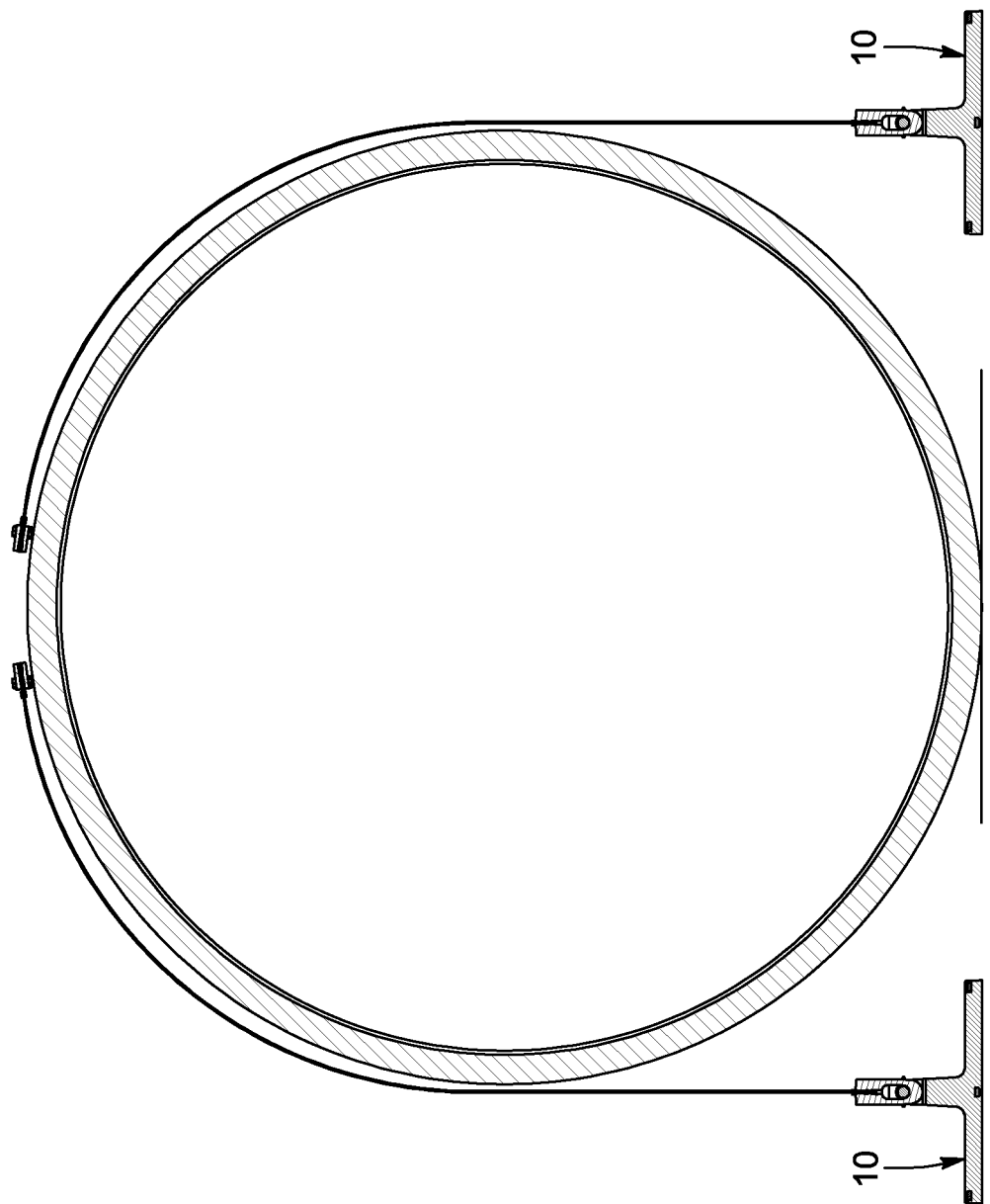
FIG. 22 schematically illustrates a cross-section view along line XXII of FIG. 21.
Figure 23:
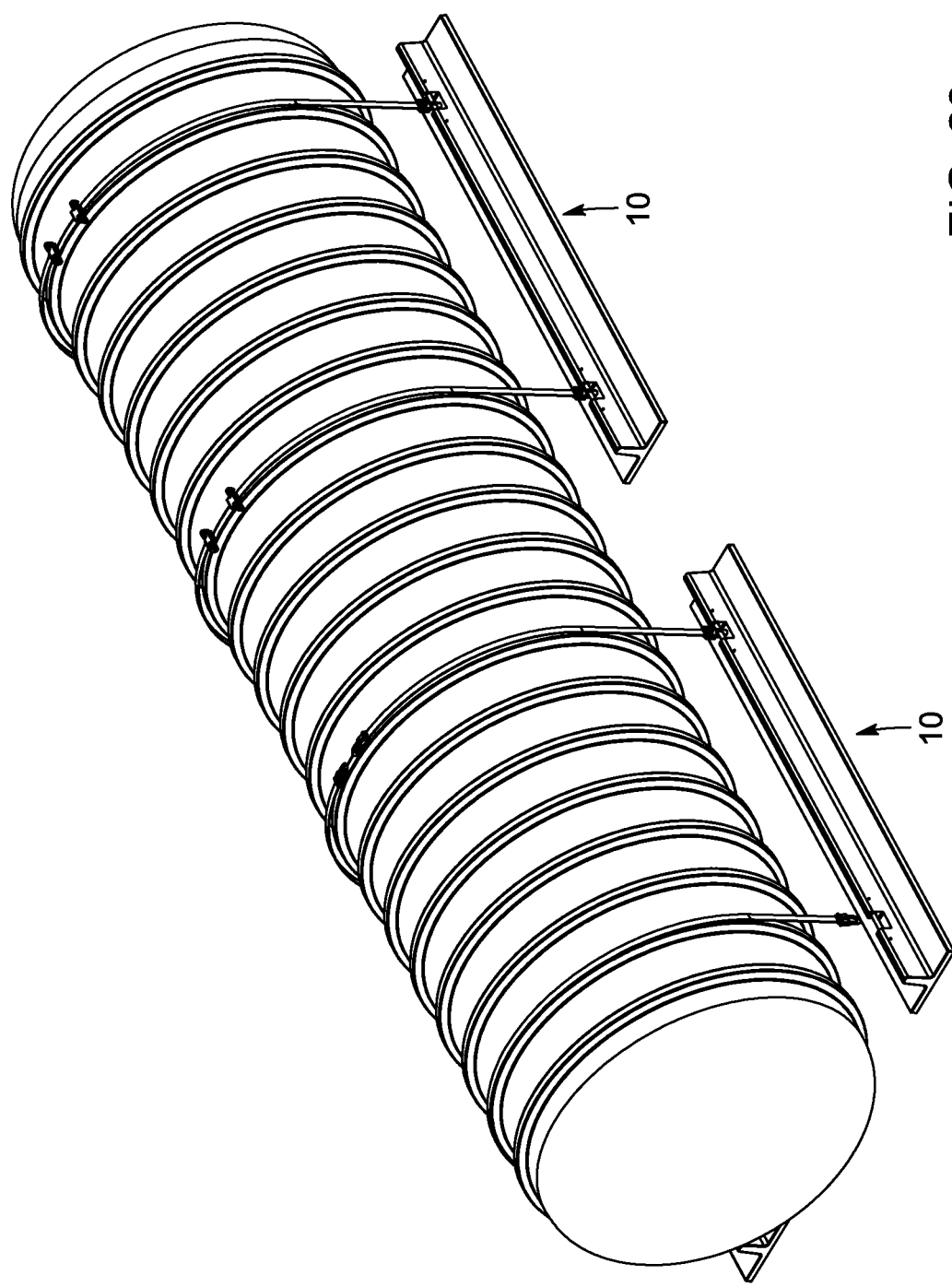
FIG. 23 schematically illustrates a perspective view of an anchor anchoring an underground storage tank.

Referring to FIGS. 10 and 15, the pivoted D-shaped hook 48 is generally perpendicular to the anchoring strap 49.

Alternatively, referring now to FIGS. 16 to 19, the pivoted D-shaped hook 48 and a C-shaped hook 50 may be attached to opposed ends of the anchoring strap 49.

Further Optional Implementations

FIGS. 24 to 33 illustrate implementations of the anchor including multiple retention mechanisms to offer various locations for anchoring the underground tank.

FIGS. 34 to 38 illustrate implementations of attachment mechanisms of the underground tank configured to cooperate with one or more strap(s) anchorable to the anchor.

Figure 24:
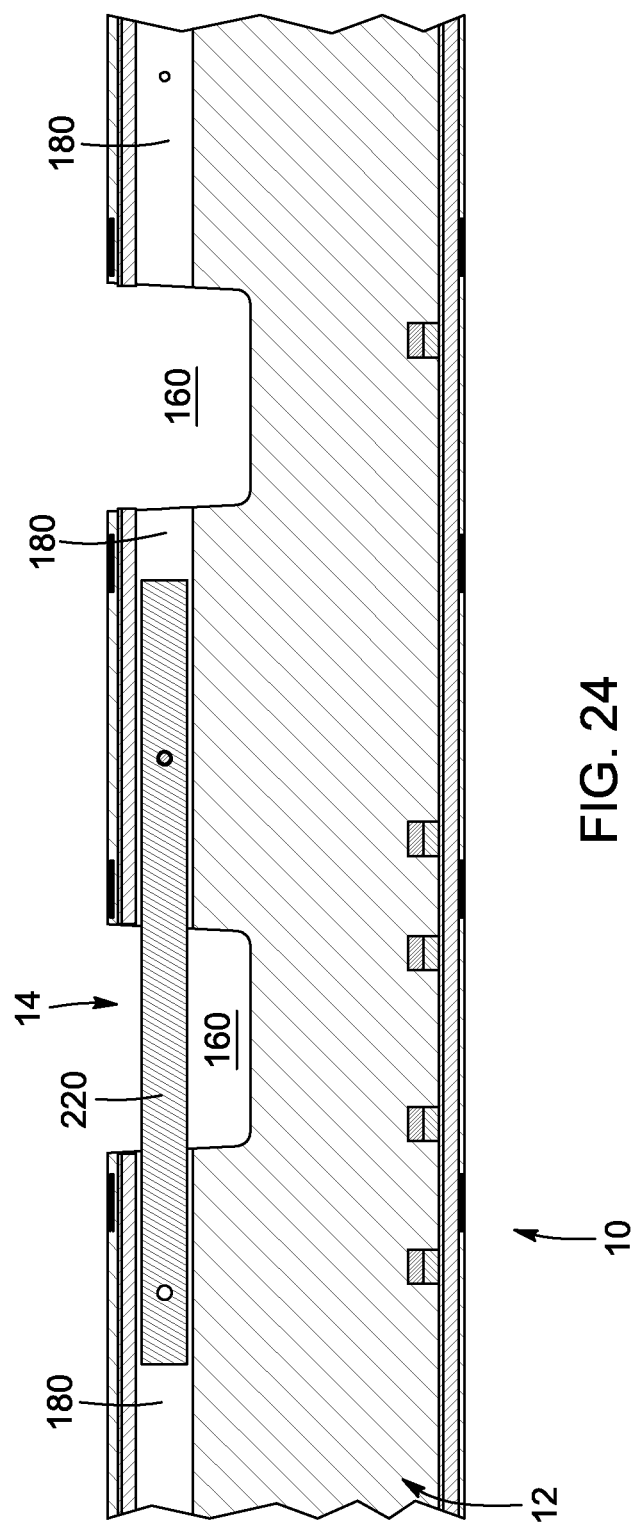
FIG. 24 schematically illustrates a side view of part of an anchor including multiple adjacent retention mechanisms for anchoring an underground storage tank.
Figure 26:
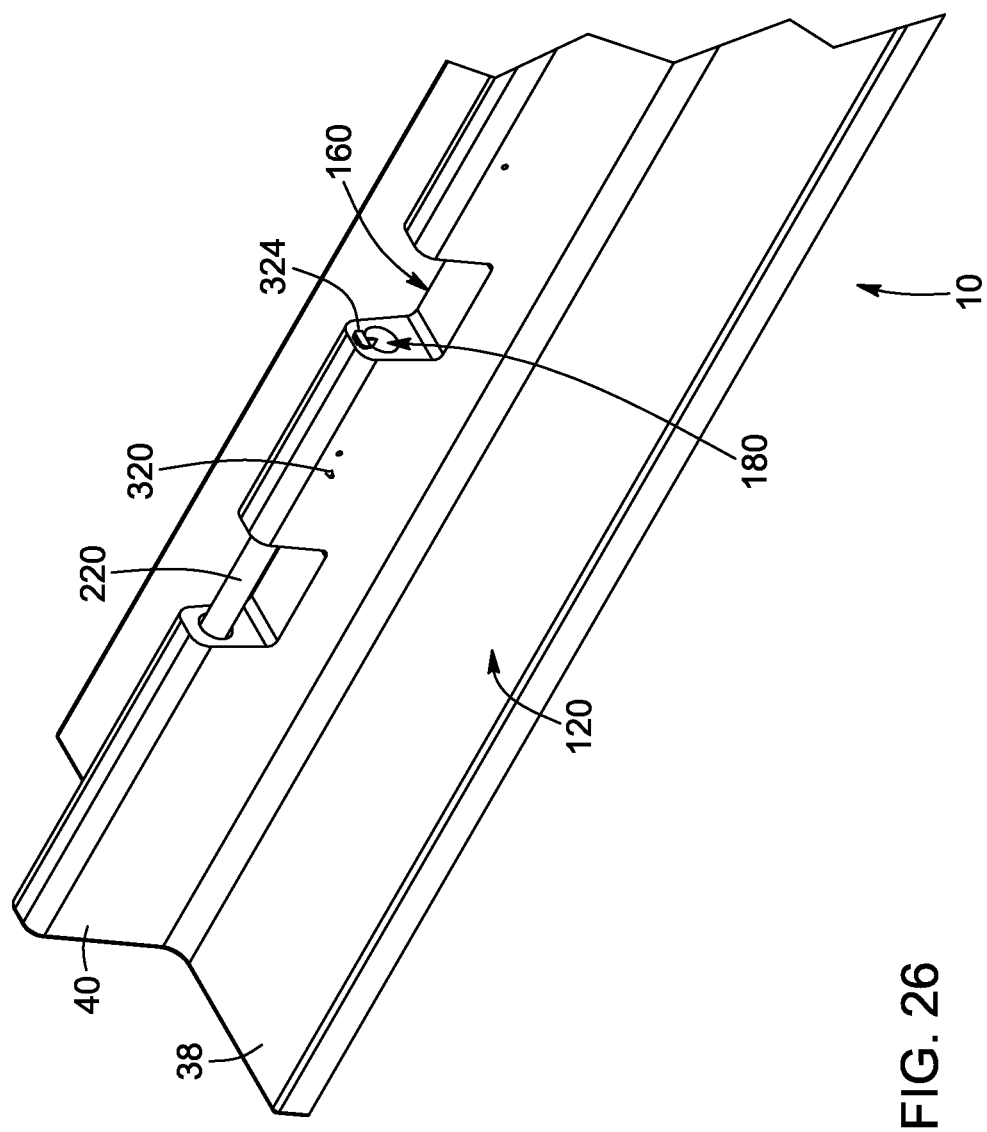
FIG. 26 schematically illustrates a perspective view of a part of an anchor including two adjacent retention mechanisms for anchoring an underground storage tank.
Figure 28:
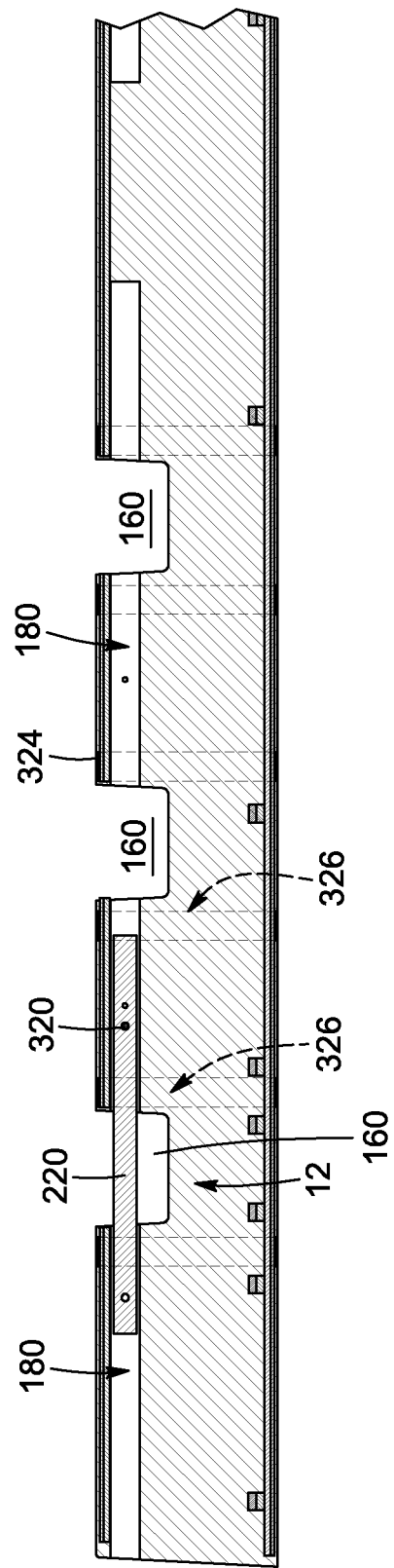
FIG. 28 schematically illustrates a cross-section view of a part of an anchor including three adjacent retention mechanisms for anchoring an underground storage tank.
Figure 29:
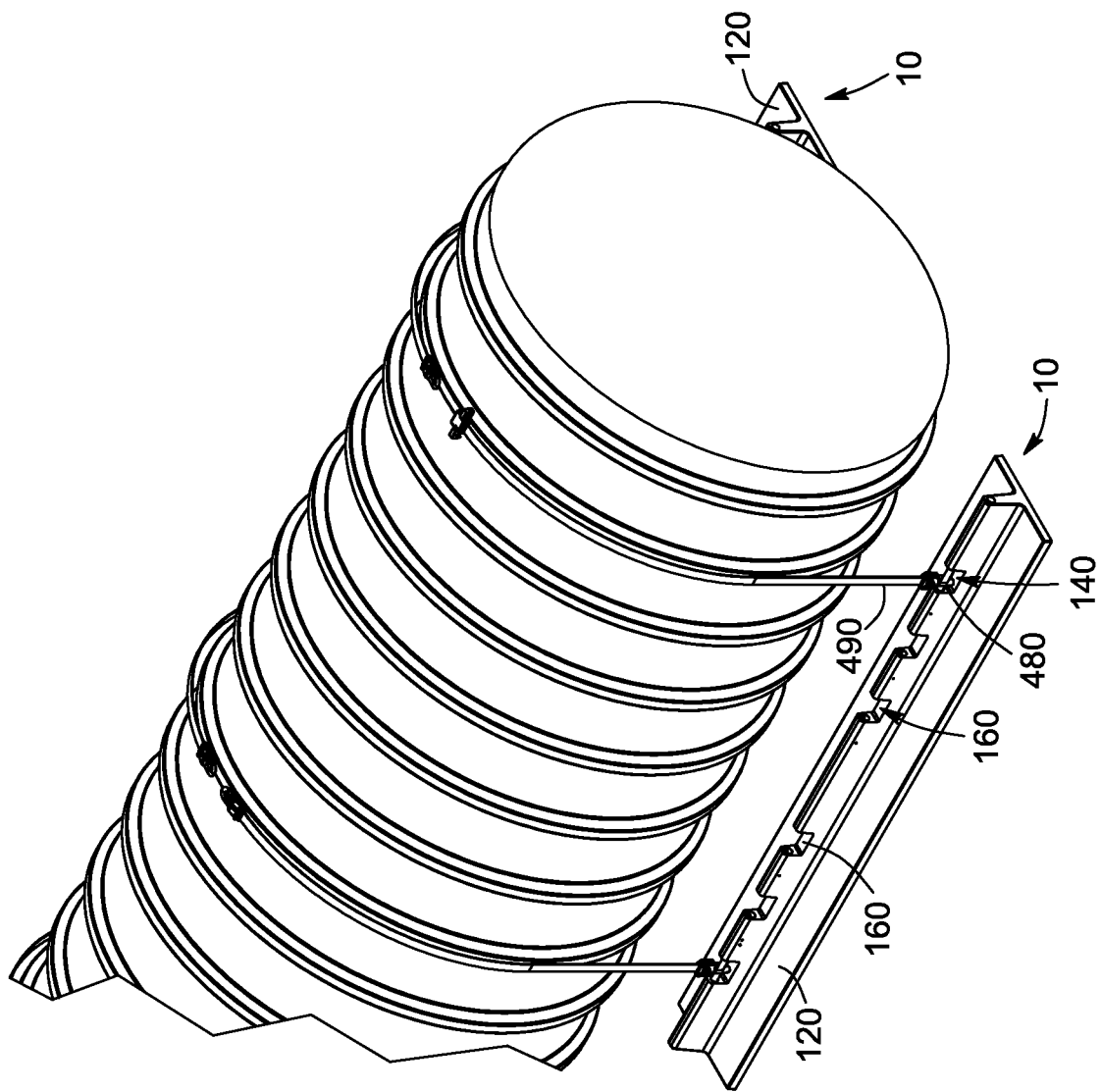
FIG. 29 schematically illustrates a perspective view of a part of an anchor anchoring an underground storage tank.
Figure 30:
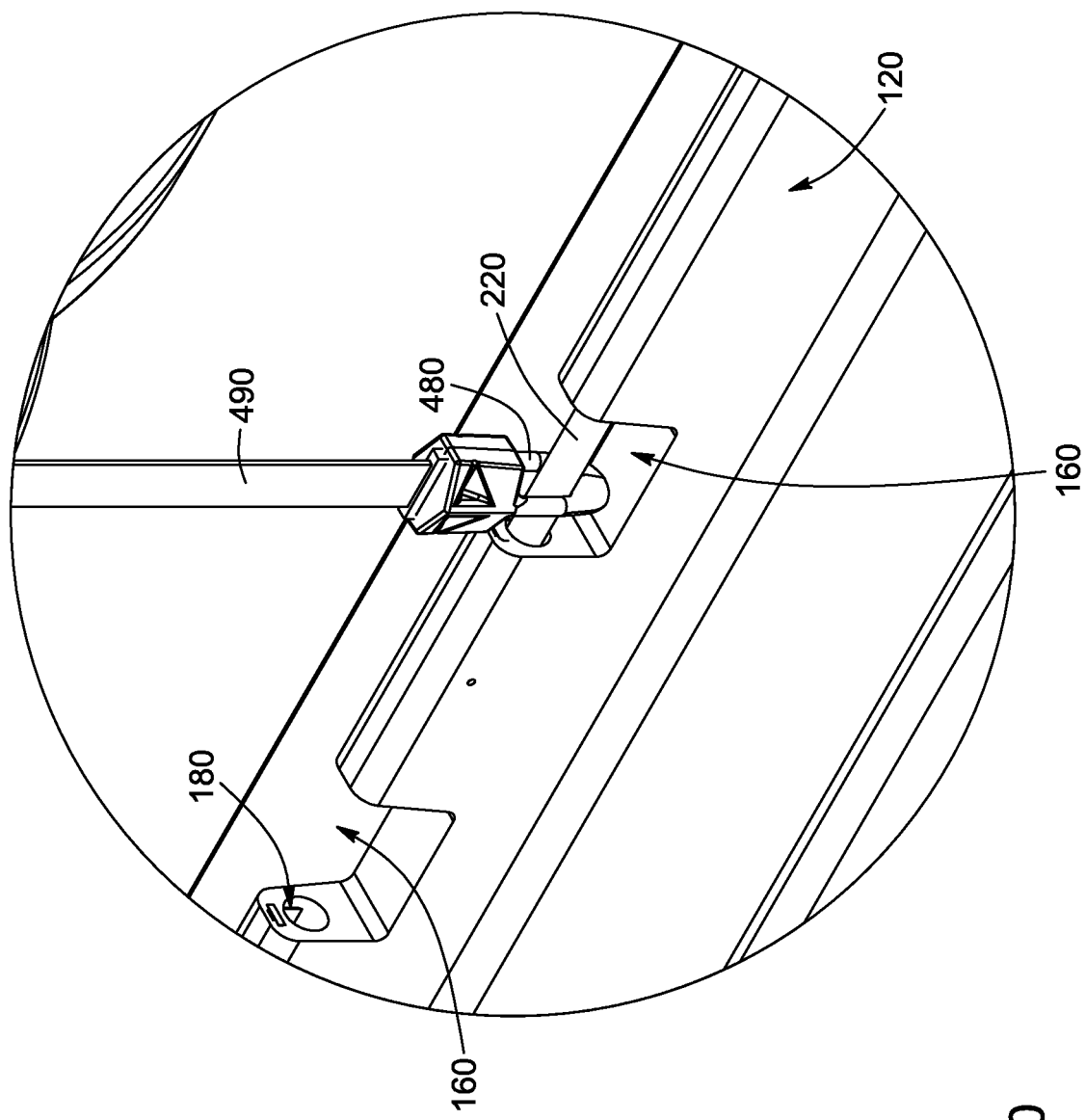
FIG. 30 is a close-up view of the D-shaped hook hooked to the retention mechanism of the anchor of FIG. 29.

In some implementations, the anchor may be configured to provide multiple attachments points along the underground tank by including multiple retention mechanisms for retaining corresponding straps. Referring to FIGS. 24, 26 and 28, the anchor 10 may have multiple openings 160 along its length, at least two adjacent openings being sized and shaped to cooperate with a retention member 220. Each of the openings 160 may be in communication with corresponding opposed chambers 180, and the chambers 180 of adjacent openings can also communicate with each other. The chambers 180 can be formed as a collinear tunnel such that the retention member 220, such as a bar, could be inserted and slid through the chambers 180.

In some implementations, one of the chambers proximate the edge of the anchor can end at the edge of the anchor as a hole, allowing insertion of other elements. For instance, one or more retention members can be inserted via the hole in order to be positioned at corresponding openings.

In some implementations, the retention member can be configured and sized so as to be inserted into the chambers via the opening. The retention member may have a construction allowing it to collapse or telescope to allow deployment into the opening and then expanded within the opening so that its opposed ends insert into corresponding chambers. The retention member may be composed of materials allowing sufficient flexibility to deflect while being inserted into the chambers, e.g., pultruded materials.

In some implementations, the retention member can be sized so as to be located at a single opening to provide an attachment point. For example, as seen in FIG. 24, the retention member 220 can slide along the collinear tunnel 180 such that only one the two adjacent openings 160 can be closed by the retention member 220. Alternatively, the retention member can be sized so as to extend across multiple openings and provide multiple attachment points.

It should also be noted that some of the openings can have a fixed rod that passes over an upper part of the opening and which is embedded into opposed sides of the base, thereby forming a fixed attachment point rather than a slidable attachment point (e.g., as in the case for implementations of the retention member). The fixed rod attachment points can be used to attach various kinds of hooks (e.g., C-hooks) or other mechanisms that can attach to a fixed rod.

Figure 25:
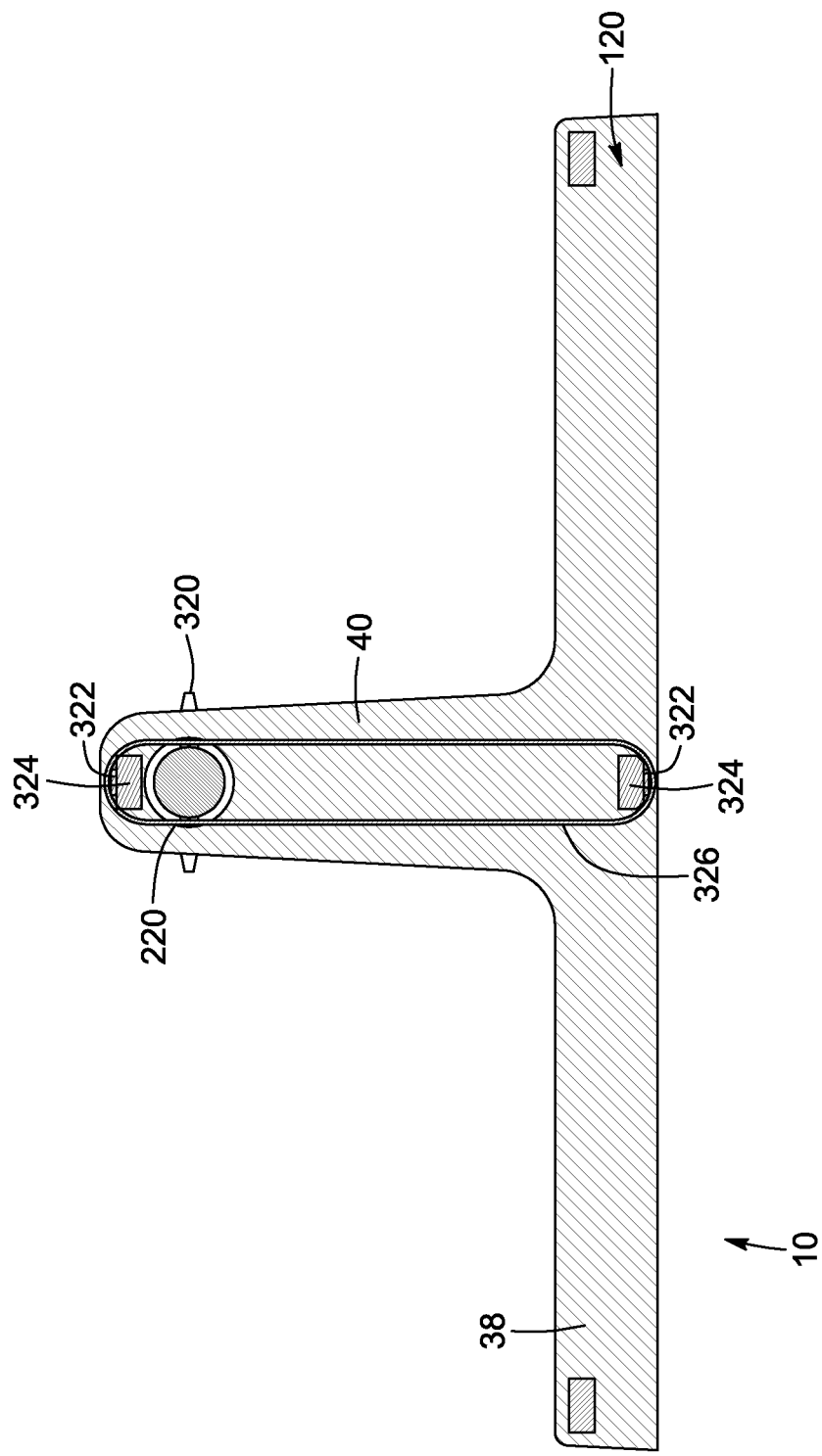
FIG. 25 schematically illustrates a cross-section view showing a locking mechanism of an anchor anchoring an underground storage tank.
Figure 27:
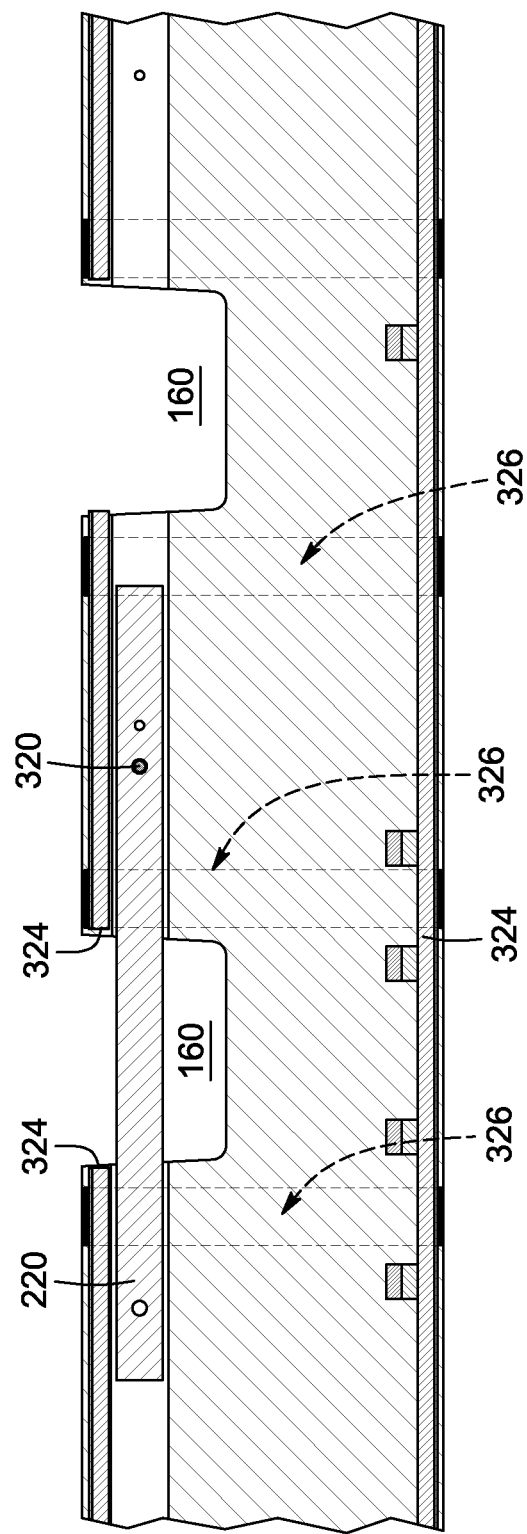
FIG. 27 schematically illustrates a cross-section view of a part of an anchor including two adjacent retention mechanisms for anchoring an underground storage tank.

Referring to FIGS. 25 and 27, the anchor 10 may include a polymer concrete base 120 configured to slidably engage a pultruded retaining bar 220 which can be locked in place by a fiberglass pultruded pin 320. The base 120 may also be configured to include fiberglass pultruded rebar 322 and 324 of different sizes and thicknesses so as to reinforce the structure, and fiberglass filament winding 326. FIG. 28 shows a similar implementation including three adjacent openings 160 and a collinear tunnel 180.

Figure 31:
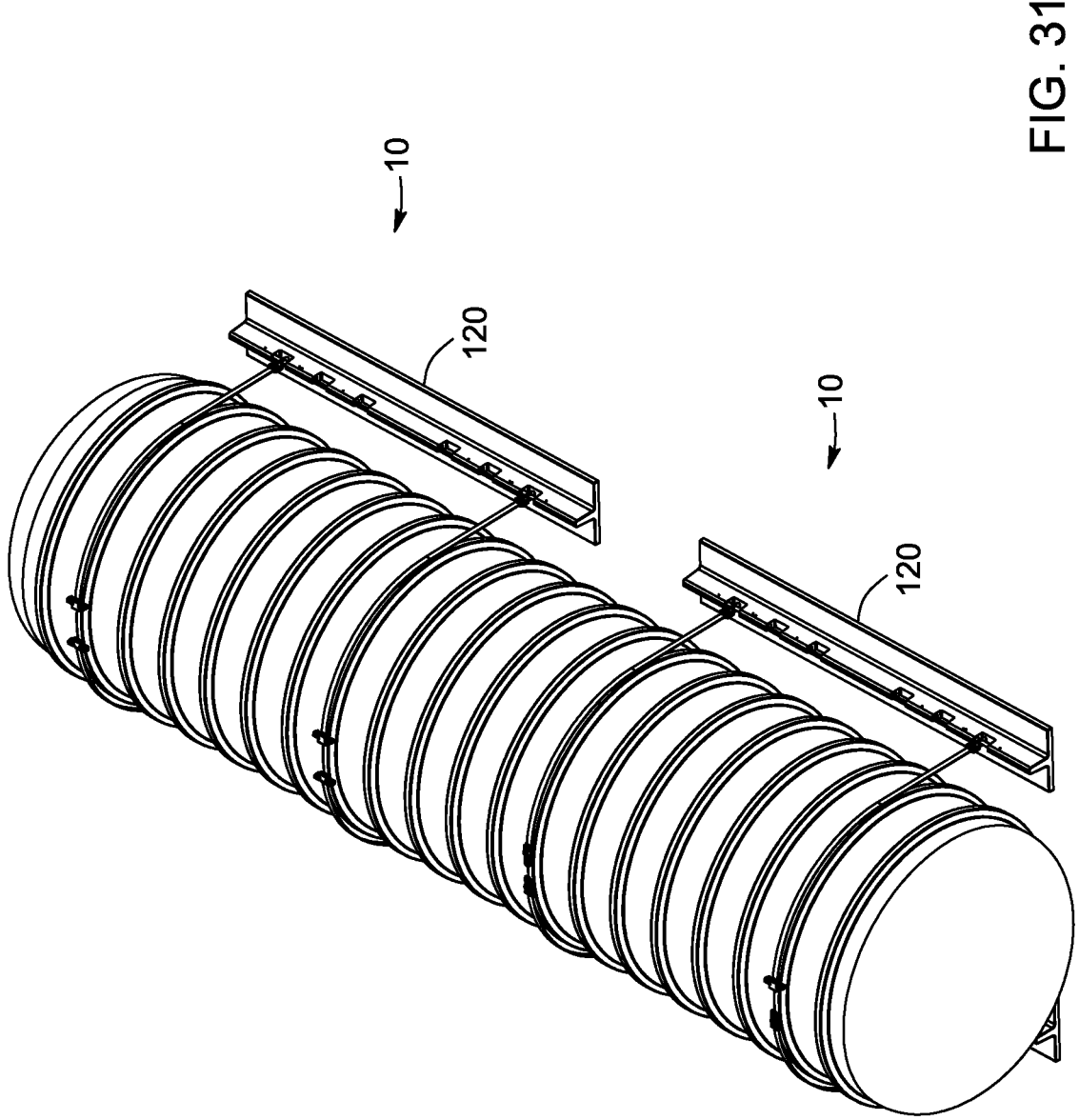
FIG. 31 schematically illustrates a perspective view of anchors anchoring an underground tank.

In the implementations illustrated in FIGS. 29 to 33, the anchor can have multiple openings 160 for providing the possibility for multiple attachment points with a retention mechanism 140 adapted to retain a hook 480 and strap 490 and thereby anchoring the underground tank. As better seen in FIG. 30, a D-shaped hook 480 may be hooked to the retention member 220 within either one of the three adjacent openings 160, depending on the position of the retention member 220 with respect to the collinear tunnel 180. Optionally, several anchors may be provided along each lateral side of the underground tank to provide as many attachment points as needed. For example, FIG. 31 shows an underground tank with two anchors on either lateral side, where some of the attachment points are being used. Referring to FIGS. 32 and 33, a same strap 490 can hold down the underground tank with each of the two D-shaped hooks 480 anchored to one retention mechanism 140 on either side of the tank.

Referring to FIGS. 34 to 38, the straps may be attached and secured at the top of the tank via various attachment mechanisms, examples of which are illustrated. It should be noted that various other mechanisms can be used with the anchors described herein.

The invention claimed is:

1. An anchor for anchoring an underground storage tank, the anchor comprising:
    a composite base comprising:
        a footing; and
    a spine extending upwardly from the footing so as to define footing portions on either side of the spine;
    wherein the footing and the spine have a composite composition comprising:
        a matrix material; and
    a reinforcement structure embedded within the matrix material; and
    a retention mechanism connected to the spine of the composite base for retaining a hook for anchoring the underground storage tank, wherein the retention mechanism further comprises:
        an opening in the spine;
    a first chamber and a second chamber extending from the opening in generally opposed relation to each other in the spine;

a retention member comprising a first end and a second end respectively insertable into the first chamber and the second chamber, the retention member being sized and configured to be displaceable between:

an open position where the first end of the retention member is located within the opening and is insertable through the hook; and a closed position where the first end is located within the first chamber and the second end is located in the second chamber, thereby retaining the hook with respect to the retention member.

2. The anchor of claim 1, wherein the footing portions are about equally sized.

3. The anchor of claim 1, wherein the footing portions each have an upward-facing surface for contacting overlying backfill, each upward-facing surface having area width of at least about between 4 to 14 inches for a diameter of the tank being about between 6 to 8 feet.

4. The anchor of claim 1, wherein the footing portions each have an upward-facing surface for contacting overlying backfill, each upward-facing surface having area width of at least about between 8 to 20 inches for a diameter of the tank being about 10 feet.

5. The anchor of claim 1, wherein the footing portions each have an upward-facing surface for contacting overlying backfill, each upward-facing surface having area width of at least about between 10 to 26 inches for a diameter of the tank being about 12 feet.

6. The anchor of claim 1, wherein the footing portions each have substantially a same length as the spine.

7. The anchor of claim 1, wherein the footing portions are generally equally sized.

8. The anchor of claim 1, wherein the reinforcement structure further comprises reinforcing bars.

9. The anchor of claim 8, wherein the reinforcing bars comprise:
upper reinforcement bars extending within the spine;
lower reinforcement bars extending within the footing below the spine; and
reinforcement connectors each fixed to a corresponding upper reinforcement bar and a corresponding lower reinforcement bar.

10. The anchor of claim 9, wherein the reinforcing bars further comprise additional bars provide in each of the footing portions.

11. The anchor of claim 8, wherein the reinforcing bars comprise a first upper reinforcement bar and a second upper reinforcement bar, the first upper reinforcement bar being located such that an end portion of the first upper reinforcement bar overlies the first chamber, and the second upper reinforcement bar being located such that an end portion of the second upper reinforcement bar overlies the second chamber, to provide structural reinforcement in response to upward force exerted on the retention member.

12. The anchor of claim 1, wherein the retention member is a retention bar.

13. The anchor of claim 12, wherein the retention bar has a one-piece structure.

14. The anchor of claim 12, wherein the retention bar is straight.

15. The anchor of claim 12, wherein the retention bar and the first and second chambers are oriented lengthwise along the base.

* * * * *